(12) United States Patent
Kim et al.

(10) Patent No.: US 10,493,456 B2
(45) Date of Patent: Dec. 3, 2019

(54) STRUCTURED SURFACE COMPRISING A SHAPE MEMORY POLYMER FOR MANIPULATING LIQUID DROPLETS

(71) Applicant: The Board of Trustees of the University of Illinois, Urbana, IL (US)

(72) Inventors: Seok Kim, Champaign, IL (US); Jun Kyu Park, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 130 days.

(21) Appl. No.: 15/878,622

(22) Filed: Jan. 24, 2018

(65) Prior Publication Data

US 2018/0207641 A1 Jul. 26, 2018

Related U.S. Application Data

(60) Provisional application No. 62/506,754, filed on May 16, 2017, provisional application No. 62/450,262, filed on Jan. 25, 2017.

(51) Int. Cl.
*B01L 3/00* (2006.01)
*B01L 7/00* (2006.01)
*C12M 1/00* (2006.01)

(52) U.S. Cl.
CPC ... *B01L 3/502792* (2013.01); *B01L 3/502715* (2013.01); *B01L 3/502753* (2013.01);
(Continued)

(58) Field of Classification Search
CPC ......... B01L 2300/0819; B01L 2300/12; B01L 2300/165; B01L 2300/1827;
(Continued)

(56) References Cited

U.S. PATENT DOCUMENTS

2009/0298166 A1* 12/2009 Fang ................... B01L 3/50857 435/305.2
2018/0078936 A1* 3/2018 Owens .............. B01L 3/502707

OTHER PUBLICATIONS

Adera, Solomon et al., "Non-wetting droplets on hot superhydrophilic surfaces," *Nature Communications*, 4, Article No. 2518 (2013); doi:10.1038/ncomms3518, pp. 1-7.
(Continued)

*Primary Examiner* — Jennifer Wecker
(74) *Attorney, Agent, or Firm* — Brinks Gilson & Lione

(57) ABSTRACT

A device for manipulating liquid droplets comprises a structured surface including an array of larger pillars and a number of smaller pillars distributed among the larger pillars, where each of the larger pillars comprises a shape memory polymer having a glass transition temperature $T_g$. The structured surface has an undeformed initial configuration, and, upon compression of the larger pillars, the structured surface comprises a deformed configuration. The undeformed initial configuration is recoverable from the deformed configuration by heating the shape memory polymer at or above the $T_g$. When exposed to a liquid droplet, the structured surface comprises a first wettability in the deformed configuration and a second wettability in the undeformed initial configuration. Thus, the structured surface exhibits a dynamic wettability for manipulating liquid droplets.

26 Claims, 19 Drawing Sheets

(52) U.S. Cl.
CPC ... *B01L 2300/0819* (2013.01); *B01L 2300/12* (2013.01); *B01L 2300/165* (2013.01); *B01L 2300/1827* (2013.01); *C08G 2280/00* (2013.01); *C08J 2300/24* (2013.01); *C08L 2201/12* (2013.01)

(58) Field of Classification Search
CPC ......... B01L 3/502715; B01L 3/502753; B01L 3/502792; C08G 2280/00; C08J 2300/24; C08L 2201/12
See application file for complete search history.

(56) References Cited

OTHER PUBLICATIONS

Bai, Hao et al., "Direction Controlled Driving of Tiny Water Drops on Bioinspired Artificial Spider Silks," *Advanced Materials*, 22 (2010) pp. 5521-5525.
Bhushan, Bharat et al., "Micro-, nano- and hierarchical structures for superhydrophobicity, self-cleaning and low adhesion," *Phil. Trans. R. Soc. A*, 367 (2009) pp. 1631-1672.
Bixler, Gregory D. et al., "Anti-fouling properties of microstructured surfaces bio-inspired by rice leaves and butterfly wings," *Journal of Colloid and Interface Science*, 419 (2014) pp. 114-133.
Carman, Michelle L. et al., "Engineered antifouling microtopographies—correlating wettability with cell attachment," *Biofouling*, 22, 1 (2006) pp. 11-21.
Chen, Chi-Mon et al., "Directed Water Shedding on High-Aspect-Ratio Shape Memory Polymer Micropillar Arrays," *Advanced Materials*, 26 (2014) pp. 1283-1288.
Darhuber, Anton A. et al., "Thermocapillary Actuation of Droplets on Chemically Patterned Surfaces by Programmable Microheater Arrays," *Journal of Microelectromechanical Systems*, 12, 6 (2003) pp. 873-879.
Del Cerro, Daniel Arnaldo et al., "Leidenfrost Point Reduction on Micropatterned Metallic Surfaces," *Langmuir*, 28 (2012) pp. 15106-15110.
Eisenhaure, Jeffrey D. et al., "Microstructured Shape Memory Polymer Surfaces with Reversible Dry Adhesion," *ACS Applied Materials & Interfaces*, 5 (2013) pp. 7714-7717.
Eisenhaure, Jeffrey et al., "An Internally Heated Shape Memory Polymer Dry Adhesive," *Polymers*, 6 (2014) pp. 2274-2286.
Eisenhaure, Jeffrey D. et al., "The Use of Shape Memory Polymers for Microassembly by Transfer Printing," *Journal of Microelectromechanical Systems*, 23, 5 (2014) pp. 1012-1014.
Eral, H. B. et al., "Contact angle hysteresis: a review of fundamental and applications," *Colloid Polym Sci*, 291 (2013) pp. 247-260.
Fair, R. B., "Digital microfluidics: is a true lab-on-a-chip possible?," *Microfluid Nanofluid*, 3 (2007) pp. 245-281.
Feng, Shile et al., "Radial Wettable Gradient of Hot Surface to Control Droplets Movement in Directions," *Scientific Reports*, 5, Article No. 10067 (2015); pp. doi:10.1038/srep10067; pp. 1-7.
Firouzeh, Amir et al., "An Under Actuated Robotic Arm with Adjustable Stiffness Shape Memory Polymer Joints," International Conference on Robotics and Automation (ICRA); Washington State Convention Center (May 26-30, 2015) pp. 2536-2543.
Hernandez, Sandra C. et al., "Chemical Gradients on Graphene to Drive Droplet Motion," *ACS Nano*, 7, 6 (2013) pp. 4746-4755.
Hou, Yongping et al., "Temperature-controlled directional spreading of water on a surface with high hysteresis," *NPG Asia Materials*, 5 (2013), pp. 1-5.
Hu, Huan et al., "Hierarchically structured re-entrant microstructures for superhydrophobic surfaces with extremely low hysteresis," *J. Micromech. Microeng.*, 24 (2014) pp. 1-9.
Huang, C. J. et al., "A biocompatible open-surface droplet manipulation platform for detection of multi-nucleotide polymorphism," *Lab Chip*, 14 (2014) pp. 2057-2062.

Kobrin, B. et al., "An Improved Chemical Resistance and Mechanical Durability of Hydrophobic FDTS Coatings," *J. Phys.: Conf. Ser.*, 34 (2006) pp. 454-457.
Kunzelman, Jill et al., "Self-assembly of chromogenic dyes—a new mechanism for humidity sensors," *J. Mater. Chem.* 17 (2007) pp. 2989-2991.
Lee, Choongyeop et al., "Two types of Cassie-to-Wenzel wetting transitions on superhydrophobic surfaces during drop impact," *Soft Matter*, 11 (2015) pp. 4592-4599.
Kwok, D. Y. et al., "Contact angle measurements and interpretation: wetting behavior and solid surface tensions for poly(alkyl methacrylate) polymers," *J. Adhesion Sci. Technol.*, 14, 5 (2000) pp. 719-743.
Lendlein, Andreas et al., "Biodegradable, Elastic Shape-Memory Polymers for Potential Biomedical Applications," *Science*, 296 (2002) pp. 1673-1676.
Li, Ri et al., "Adhesion of liquid droplets to rough surfaces," *Physical Review E*, 82 (2010) pp. 041608-1-041608-6.
Lin, Jr-Lung et al., "Model Description of Contact Angles in Electrowetting on Dielectric Layers," *Langmuir*, 22 (2006) pp. 484-489.
Liu, Guangming et al., "Water Droplet Motion Control on Superhydrophobic Surfaces: Exploiting the Wenzel-to-Cassie Transition," *Langmuir*, 27 (2011) pp. 2595-2600.
Luk, Vivienne N. et al., "Pluronic Additives: A Solution to Sticky Problems in Digital Microfluidics," *Langmuir*, 24 (2008) pp. 6382-6389.
Luo, Hongsheng et al., "Temperature sensing of conductive shape memory polymer composites," *Materials Letters*, 140 (2015) pp. 71-74.
Marmur, Abraham, "Wetting on Hydrophobic Rough Surfaces: To Be Heterogeneous or Not to Be?," *Langmuir*, 19 (2003) pp. 8343-8348.
Mertaniemi, Henrikki et al., "Superhydrophobic Tracks for Low-Friction, Guided Transport of Water Droplets," *Advanced Materials*, 23 (2011) pp. 2911-2914.
Mettu, Srinivas et al., "Motion of Drops on a Surface Induced by Thermal Gradient and Vibration," *Langmuir*, 24 (2008) pp. 10833-10837.
Ouenzerfi, Safouene et al., "Experimental Droplet Study of Inverted Marangoni Effect of a Binary Liquid Mixture on a Nonuniform Heated Substrate," *Langmuir*, 32 (2016) pp. 2378-2388.
Pierce, E. et al., "Understanding of sliding and contact angle results in tilted plate experiments," *Colloids and Surfaces A: Physicochem. Eng. Aspects*, 323 (2008) pp. 73-82.
Seo, Jungmok et al., "Path-programmable water droplet manipulations on an adhesion controlled superhydrophobic surface," *Scientific Reports*, 5, Article No. 12326 (2015); doi:10.1038/srep12326; pp. 1-10.
Shastry, Ashutosh et al., "Directing Droplets Using Microstructured Surfaces," *Langmuir*, 22 (2006) pp. 6161-6167.
Shen, Hsien-Hua et al., "EWOD microfluidic systems for biomedical applications," *Microfluid Nanofluid*, 16 (2014) pp. 965-987.
Small, IV, Ward et al., "Shape Memory Polymer Stent With Expandable Foam: A New Concept for Endovascular Embolization of Fusiform Aneurysms," *IEEE Transactions on Biomedical Engineering*, 54, 6 (2007) pp. 1157-1160.
Takashima, Kazuto et al., "Pneumatic artificial rubber muscle using shape-memory polymer sheet with embedded electrical heating wire," *Smart Mater. Struct.*, 23 (2014) pp. 1-9.
Vergauwe, Nicolas et al., "A versatile electrowetting-based digital microfluidic platform for quantitative homogeneous and heterogeneous bio-assays," *J. Micromech. Microeng.*, 21 (2011) pp. 1-11.
Wu, Jun et al., "Advanced understanding of stickiness on superhydrophobic surfaces," *Scientific Reports*, 3, Article No. 3268 (2013); doi:10.1038/srep03268; pp. 1-4.
Xie, Tao et al., "Facile tailoring of thermal transition temperatures of epoxy shape memory polymers," *Polymer* 50 (2009) pp. 1852-1856.
Xie, Tao, "Recent advances in polymer shape memory," *Polymer* 52 (2011) pp. 4985-5000.
Xu, Zhida et al., "Black silicon solar thin-film microcells integrating top nanocone structures for broadband and omnidirectional light-trapping," *Nanotechnology*, 25 (2014) pp. 1-8.

(56) References Cited

OTHER PUBLICATIONS

Yang, Jing-Tang et al., "Droplet Manipulation on a Hydrophobic Textured Surface With Roughened Patterns," *Journal of Microelectromechanical Systems*, 15, 3 (2006) pp. 697-707.

Yang, Jing-Tang et al., "Conversion of Surface Energy and Manipulation of a Single Droplet across Micropatterned Surfaces," *Langmuir*, 24 (2008) pp. 9889-9897.

Yoon, Jeong-Yeol et al., "Preventing Biomolecular Adsorption in Electrowetting-Based Biofluidic Chips," *Anal. Chem.*, 75 (2003) pp. 5097-5102.

Zhang, Yi et al., "A surface topography assisted droplet manipulation platform for biomarker detection and pathogen identification," *Lab Chip*, 11 (2011) pp. 398-406.

Zheng, Yongwei et al., "Light-induced shape recovery of deformed shape memory polymer micropillar arrays with gold nanorods†," *RSC Advances*, 5 (2015) pp. 30495-30499.

\* cited by examiner

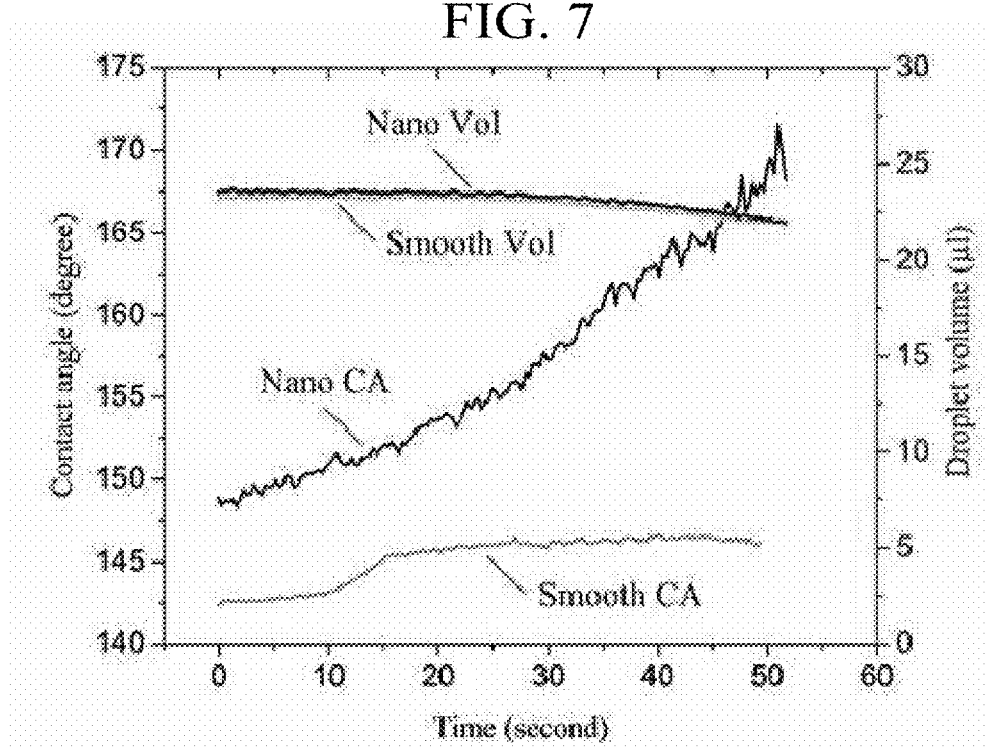

STRUCTURED SURFACE COMPRISING A SHAPE MEMORY POLYMER FOR MANIPULATING LIQUID DROPLETS

RELATED APPLICATIONS

The present patent document claims the benefit of priority under 35 U.S.C. § 119(e) to U.S. Patent Application Ser. No. 62/450,262, filed on Jan. 25, 2017, and U.S. Patent Application Ser. No. 62/506,754, filed on May 16, 2017. Both of the preceding patent applications are hereby incorporated by reference in their entirety.

TECHNICAL FIELD

The present disclosure is related generally to surfaces having engineered wetting characteristics and more particularly to a structured surface that exploits the properties of shape memory polymers to manipulate liquid droplets.

BACKGROUND

The ability to manipulate and move droplets on a surface in a non-contact, controllable manner could enable numerous applications, such as lab-on-a-chip devices, where programmable droplet motion is desired without requiring bulky instruments. To this end, studies have investigated driving forces to manipulate water droplets, such as electrocapillary forces in electrowetting-on-dielectric (EWOD), and thermal, chemical, and/or surface morphological gradient forces. While exploitation of these driving forces shows promise, the manipulation of droplets on surfaces remains challenging due to contact angle hysteresis (CAH) of water droplets. In order to move a droplet on a surface, the driving force(s) need to overcome the opposing force caused by CAH, which may be prohibitively high.

Shape memory polymers (SMPs) encompass a broad range of responsive polymers that can retain a configurational "memory" of an initial or permanent shape that can be recovered from a deformed or temporary shape upon exposure to a suitable stimulus. In the case of a thermo-responsive SMP, heating the polymer at or beyond its glass transition temperature ($T_g$) induces a drastic transition in elastic modulus from the "glassy" or rigid state to the rubbery state. As a consequence of this unique memory capability, SMPs have been extensively studied and exploited for many applications, including robotics, biomedical devices, microassembly, dry adhesives, and sensors.

BRIEF SUMMARY

A device and methods for manipulating liquid droplets that exploit the properties of shape memory polymers have been developed.

The device comprises a structured surface including an array of larger pillars and a number of smaller pillars distributed among the larger pillars, where each of the larger pillars comprises a shape memory polymer having a glass transition temperature $T_g$. The structured surface has an undeformed initial configuration, and, upon compression of the larger pillars, the structured surface comprises a deformed configuration. The undeformed initial configuration is recoverable from the deformed configuration by heating the shape memory polymer at or above the $T_g$. When exposed to a liquid droplet, the structured surface comprises a first wettability in the deformed configuration and a second wettability in the undeformed initial configuration. Thus, the structured surface exhibits a dynamic wettability for manipulating liquid droplets.

The method comprises, according to one embodiment, applying a liquid droplet to a structured surface comprising an array of larger pillars and a number of smaller pillars distributed among the larger pillars, where each of the larger pillars comprises a shape memory polymer having a glass transition temperature $T_g$. The structured surface is in a deformed configuration where the larger pillars are compressed relative to an undeformed initial configuration of the structured surface. The liquid droplet contacts the structured surface at a first apparent contact angle, which corresponds to a first wettability of the structured surface in the deformed configuration. The structured surface is then heated at or above the $T_g$ so as to recover the undeformed initial configuration, and the liquid droplet contacts the structured surface at a second apparent contact angle, which corresponds to a second wettability of the structured surface in the undeformed initial configuration. Thus, the liquid droplet may be manipulated on the structured surface.

The method comprises, according to another embodiment, applying a liquid droplet to a structured surface comprising an array of larger pillars and a number of smaller pillars distributed among the larger pillars, where each of the larger pillars comprises a shape memory polymer having a glass transition temperature $T_g$. The structured surface is in a deformed configuration where the larger pillars are compressed relative to an undeformed initial configuration of the structured surface. The structured surface includes n regions configured for independent heating, where each of the n regions includes one or more of the large pillars. The liquid droplet comprises a rear portion in contact with a first of the n regions and a leading portion forward of the rear portion. The first of the n regions is locally heated at or above the $T_g$, thereby inducing the larger pillar(s) in the first region to exhibit shape recovery to an uncompressed shape. The apparent contact angle of the rear portion of the liquid droplet becomes greater than an apparent contact angle of the leading portion of the liquid droplet, producing a morphological gradient force. The liquid droplet thereby advances on the structured surface such that the rear portion contacts a second of the n regions. The local heating is carried out sequentially for a predetermined pattern of adjacent regions to advance the droplet across the structured surface.

BRIEF DESCRIPTION OF THE DRAWINGS

FIG. 7 shows experimentally measured apparent contact angles and volume changes as functions of heating time for a water droplet on smooth and nanotextured structured surfaces.

DETAILED DESCRIPTION

A hierarchically structured surface with a changeable surface wettability that includes shape memory polymer (SMP) surface features is described herein. Due to the capability of a shape memory polymer to "remember" and recover a previous configuration upon exposure to a stimulus, such as heat, the structured surface can move between a temporary deformed configuration and a permanent configuration, thereby altering the surface wettability and enabling manipulation of a liquid droplet. Different wetting characteristics of the structured surface between the temporary deformed configuration and the permanent configuration are theoretically predicted and experimentally verified, as described below. The tunable surface wettability demonstrated in this disclosure may prove useful for droplet manipulation in digital microfluidics and other applications.

Figure 1A:
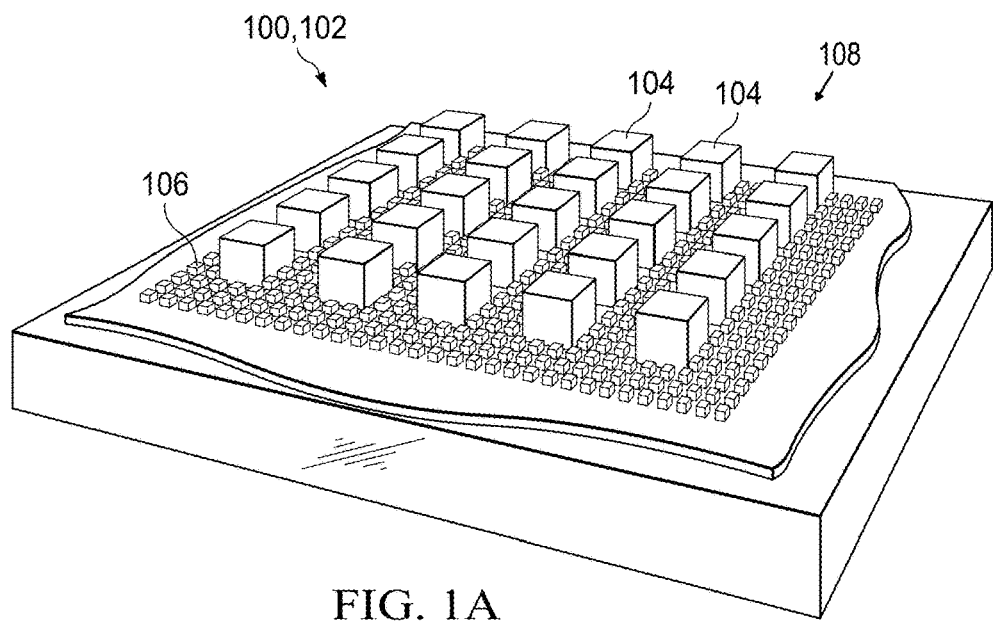
FIGS. 1A and 1B show plan view and top view schematics of a hierarchically structured surface including shape memory polymer (SMP) surface features (pillars).
Figure 1B:
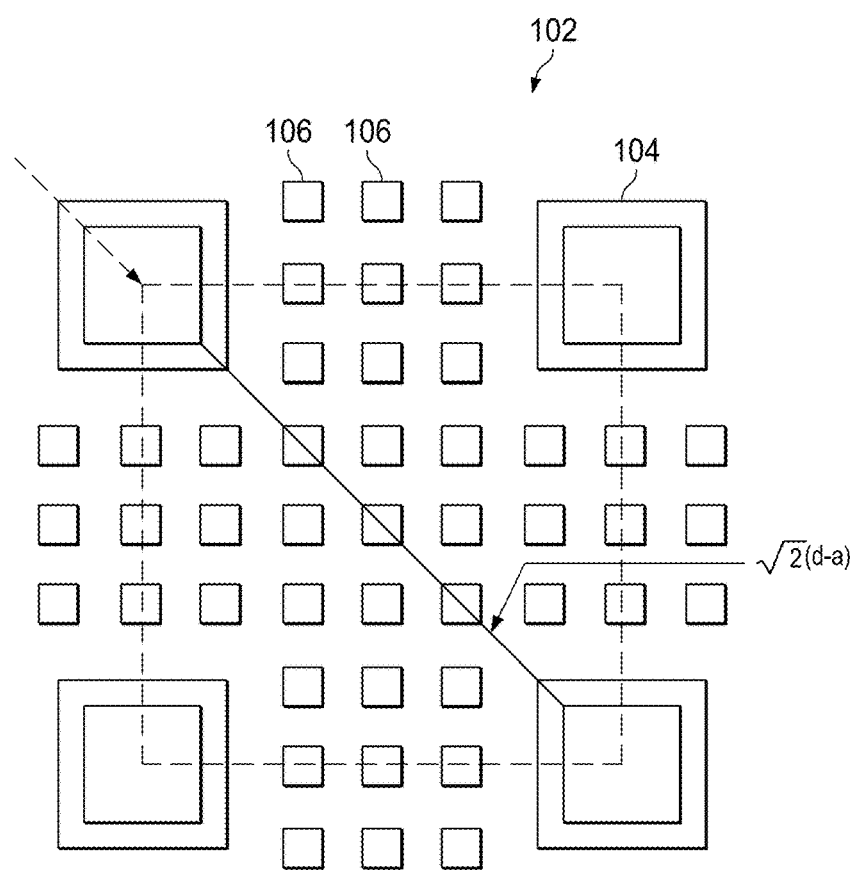

An exemplary device for manipulating liquid droplets is shown in the plan view and top view schematics of FIGS. 1A and 1B. The device 100 comprises a structured surface 102 comprising an array of larger pillars 104 and a number of smaller pillars 106 distributed among the larger pillars 104. Each of the larger pillars 104 comprises a shape memory polymer having a glass transition temperature $T_g$. The smaller pillars 106 may also comprise the shape memory polymer. The structured surface has an undeformed initial configuration 108, which may be referred to as a permanent shape, as shown in the schematic of FIG. 1A and in the scanning electron microscope (SEM) image of FIG. 1C. Upon compression of the larger pillars, the structured surface adopts a deformed configuration 110, which may be referred to as a temporary shape, as shown for example in the SEM image of FIG. 1D. The undeformed initial configuration 108 is recoverable from the deformed configuration 110 by heating at or above the $T_g$. When exposed to a liquid droplet, the structured surface 102 exhibits a first wettability in the deformed configuration 110 and a second wettability in the undeformed initial configuration 108, where the first wettability may be higher than the second wettability, as explained below. The structured surface 102 may thus exhibit a dynamic surface wettability for manipulating and/or moving liquid droplets.

Figure 2A:
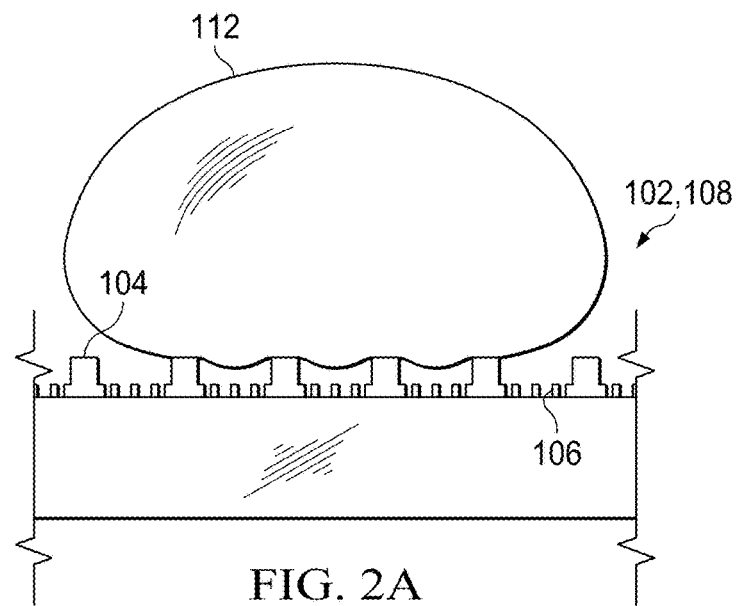
FIGS. 2A and 2B are schematics depicting portions of a structured surface in an undeformed initial configuration supporting a liquid droplet.

The hierarchically structured surface 102 is designed such that a liquid droplet wets top surfaces of the larger pillars 104 when in the permanent shape (FIGS. 2A and 2B) without contacting the smaller pillars 106. However, when the larger pillars are axially compressed in the temporary shape, a liquid droplet can wet not only the larger pillars 104 but also the smaller pillars 106 (FIGS. 2C and 2D). Thus, the structured surface 102 in the deformed configuration 110 of FIGS. 2C and 2D may be said to have a higher wettability than the structured surface 102 in the undeformed initial configuration 108 of FIGS. 2A and 2B.

Figure 2B:
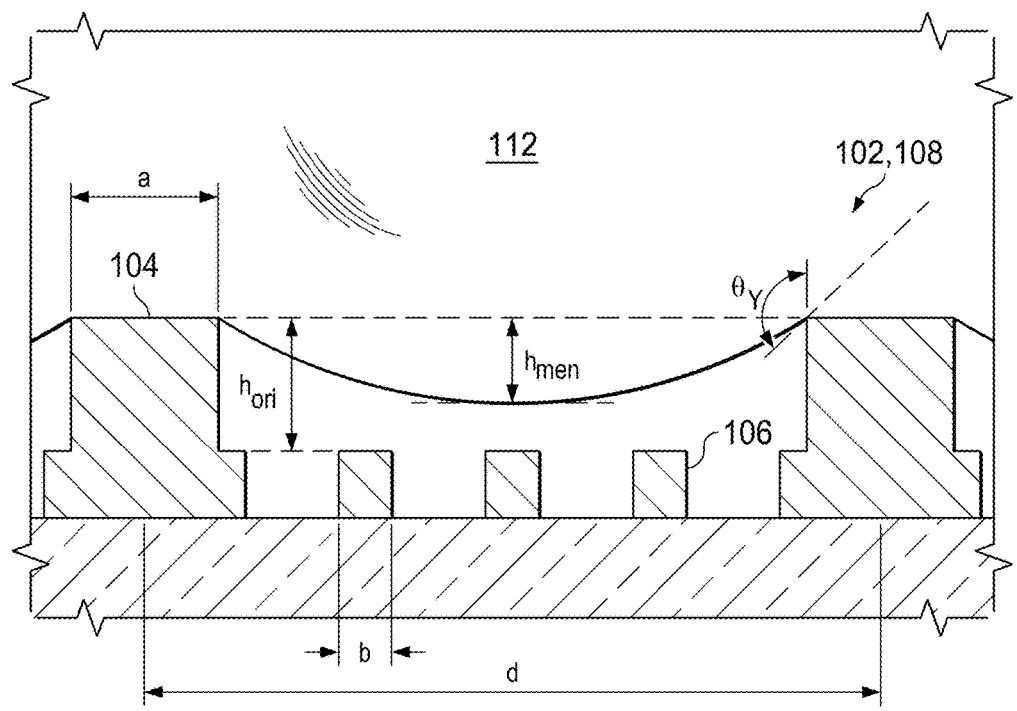
Figure 2C:
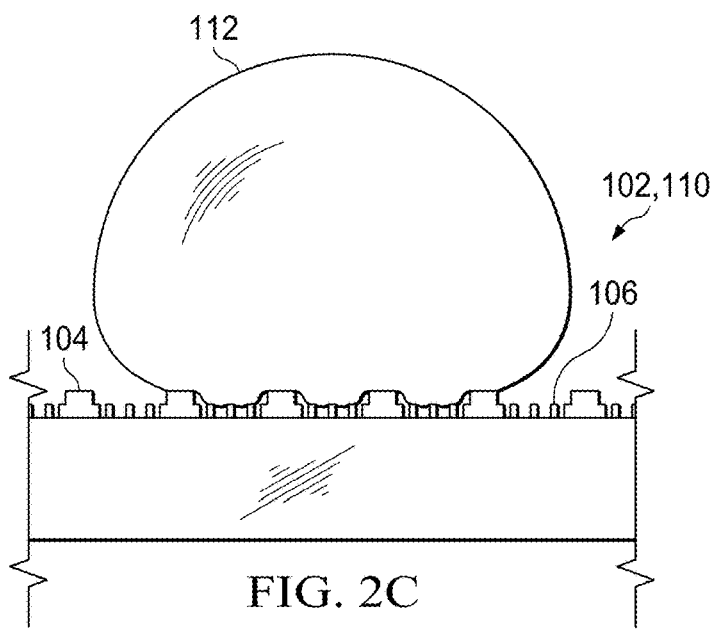
FIGS. 2C and 2D are schematics depicting portions of a structured surface in a deformed configuration supporting a liquid droplet.
Figure 2D:
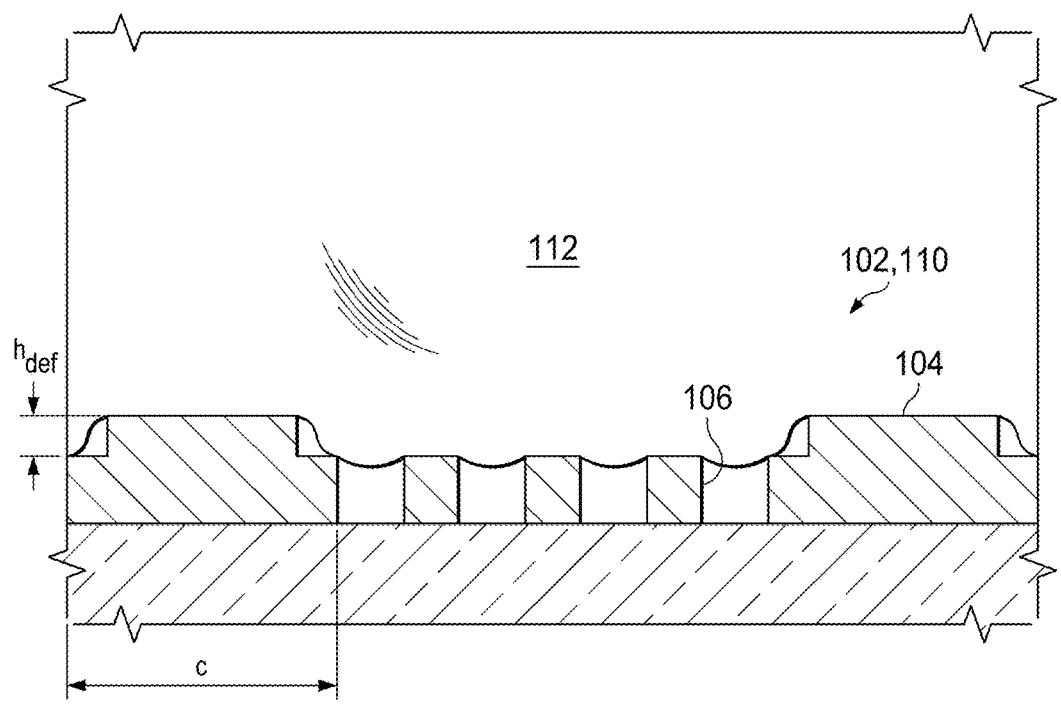

To ensure non-wetting of the smaller pillars 106 in the permanent shape, a height difference ($h_{ori}$) between the larger and smaller pillars 104,106 may be larger than the meniscus height ($h_{men}$) of a liquid droplet 112 placed on the larger pillars 104, as depicted in FIG. 2B. In other words, in the undeformed initial configuration 108, each of the larger pillars 104 has a first height $h_1$ and each of the smaller pillars 106 has a second height $h_2$, and a height difference $h_{ori}=h_1-h_2$ is preferably larger than the meniscus height of a liquid droplet 112 supported on the larger pillars 104. If this condition is satisfied, the liquid droplet 112 may wet only the larger pillars 104. The liquid droplet 112 is typically a water droplet, but the liquid droplet 112 may comprise substances or liquids other than water. If the liquid droplet 112 comprises a liquid other than water, it may be advantageous to select a liquid having a surface tension similar to that of water.

Figure 3A:
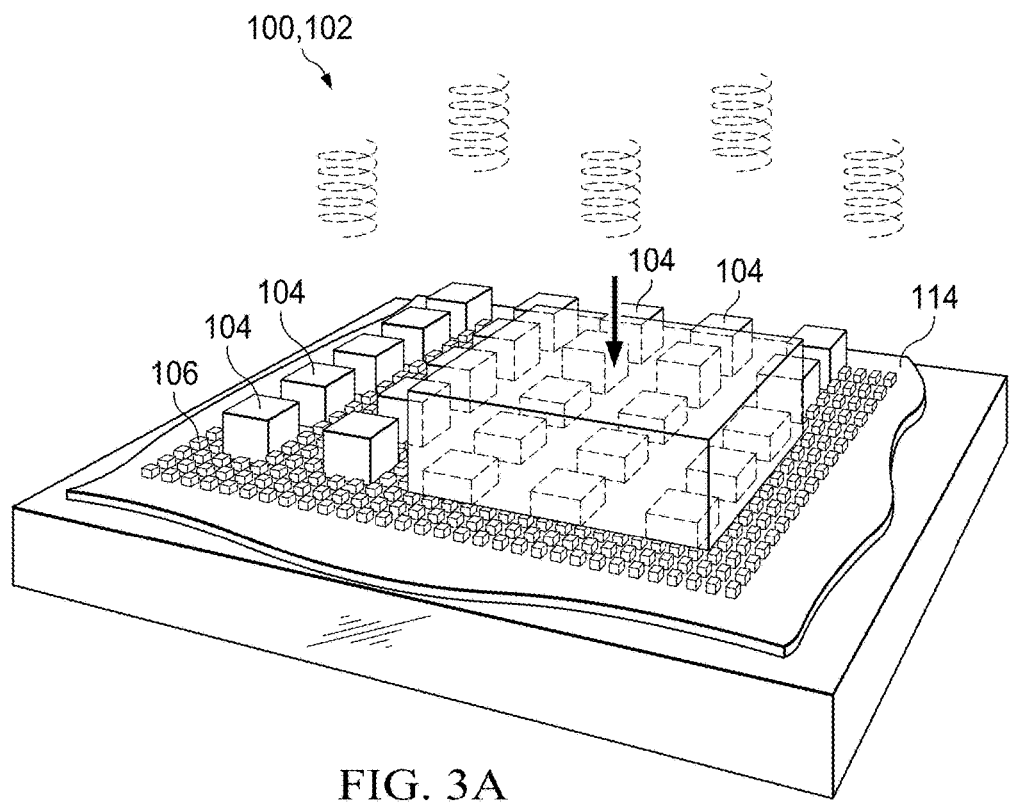
FIGS. 3A-3C schematically show a process that includes, respectively, compressing larger pillars to attain a deformed configuration of the structured surface, cooling and rigidizing the structured surface in the deformed configuration, and heating the structured surface to recover an undeformed initial configuration.
Figure 3B:
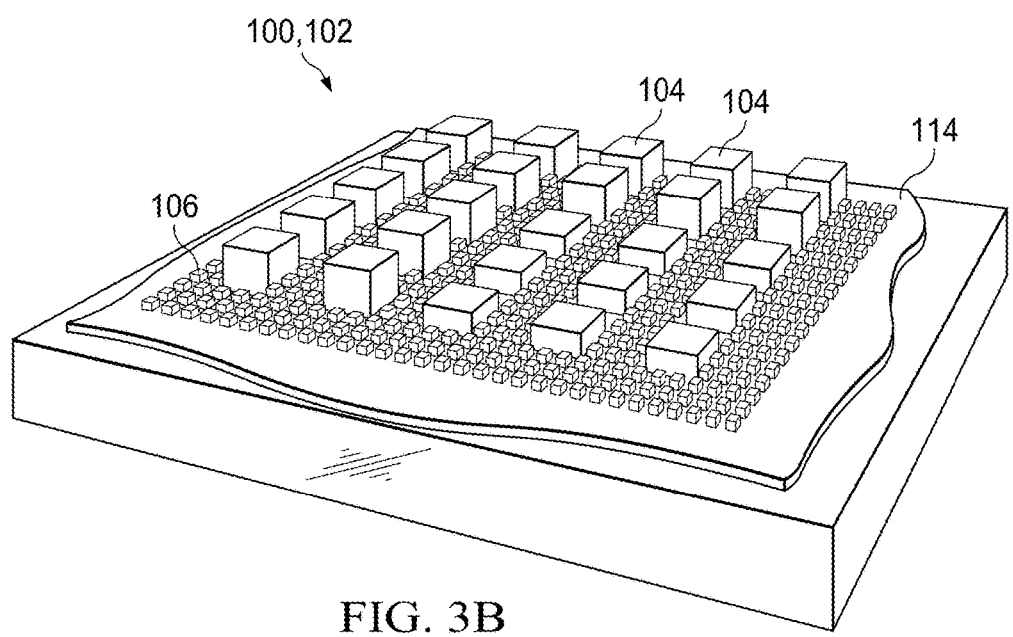
Figure 3C:
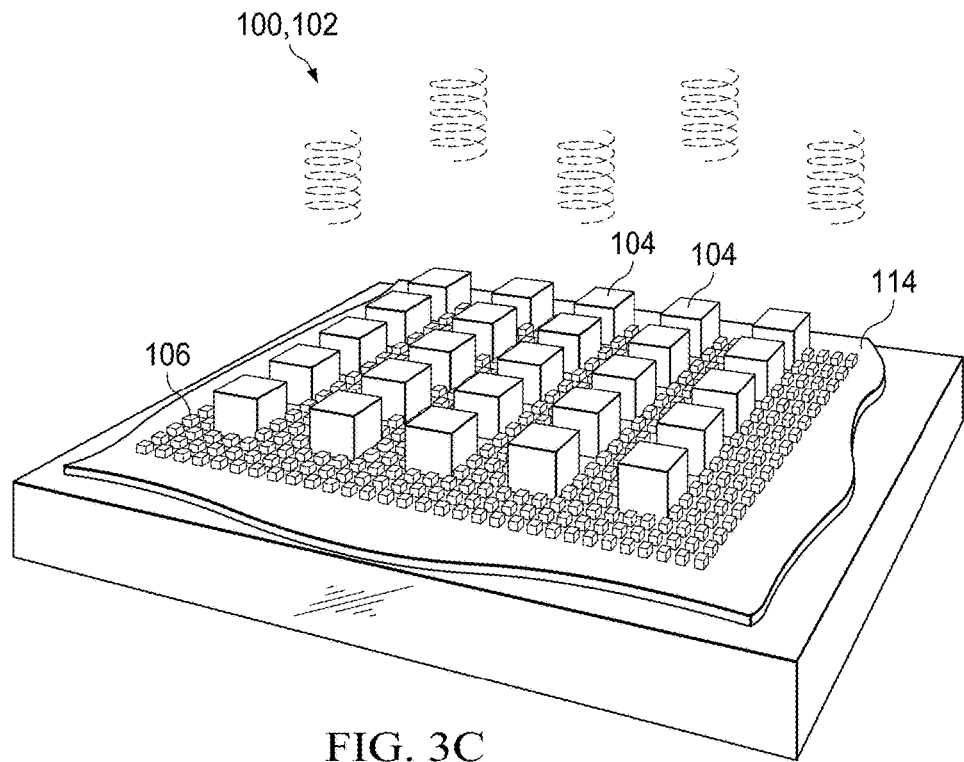

In order to create different wetting conditions of the structured surface 102, the larger pillars 104 may be compressed by a desired amount while the shape memory polymer is at a temperature at or above $T_g$. For axial compression of the larger pillars 104 without buckling, the aspect ratio (length-to-width ratio) may need to be limited to 0.8. Compression of the larger pillars 104 may be carried out by raising the temperature over $T_g$ of the shape memory polymer and applying a normal pressure (e.g., about 1 MPa), as shown in the schematic of FIG. 3A. The deformed configuration 110 or temporary shape of the structured surface 102 is fixed when the temperature is lowered below $T_g$, as indicated in FIG. 3B. After that, the undeformed initial configuration (permanent shape) 108 may be recovered by heating the shape memory polymer to or above the $T_g$, as illustrated in FIG. 3C. SEM images of the SMP pillars in permanent and temporary shapes (FIGS. 1C and 1D) demonstrate that significant shape changes may be obtained between the initial and deformed configurations 108,110.

The hierarchically structured surface 102 may be fabricated by a molding process, which is described in detail below. Consequently, both the larger and smaller pillars 104,106 may be fabricated from the shape memory polymer, and a thin film 114 of the shape memory polymer may cover the surface 102, as can be seen in FIGS. 3A-3C. The shape memory polymer employed for the structured surface 102 preferably undergoes a large change in rigidity and a strong shape memory effect over a well-defined glass transition temperature range. The change in storage modulus for some shape memory polymers can be substantial, exceeding, in some cases, a 100:1 ratio below and above $T_g$, respectively. At a minimum, the change in storage modulus may be at least about 10:1, and is more typically at least about 30:1. Suitable shape memory polymers may be based on epoxy, polyurethane, and/or (poly)ethylene-co-vinyl acetate (EVA), such as NGDE2, which is employed in the examples of this disclosure. The shape memory polymer may have a $T_g$ in the range from about 0° C. to about 150° C., although more typically the $T_g$ is above room temperature. For example, the $T_g$ may be from about 30° C. to 70° C., or from about 40° C. to 60° C.

The structured surface 102 may be intrinsically hydrophobic due to fabrication from a hydrophobic shape memory polymer or may be rendered hydrophobic by a hydrophobic coating, such as a silane coating applied to the shape memory polymer. The hydrophobic coating may be applied to top and optionally side surfaces of the large and/or small pillars. The shape memory polymer (NGDE2) used in the experiments described in this disclosure is hydrophilic with an intrinsic contact angle of 79.6°, which is below the hydrophobic threshold (an intrinsic contact angle over 90.0°) to obtain a Fakir droplet on the structured surface. To change the surface chemistry of the shape memory polymer, a silane coating, such as a heptadecafluoro tetrahydrodecyl-trichlorosilane (FDTS) monolayer, may be deposited on the surface of the SMP. The intrinsic contact angle of a water droplet on a FDTS-coated smooth and flat SMP surface is measured as 114.7°. It is noteworthy that the FDTS coating forms a monolayer on the SMP surface that is not seriously damaged from heat and mechanical loads. Therefore, FDTS-coated SMP pillars can be used repetitively without significant function deterioration.

Figure 4:
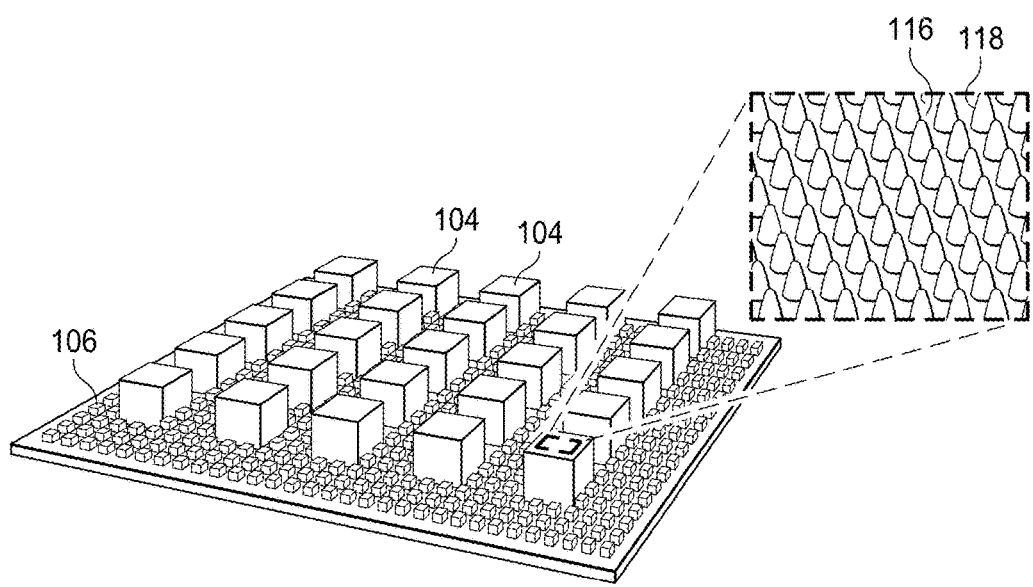
FIG. 4 shows a close-up schematic of nanotextured top surfaces of the larger pillars.

The larger and/or smaller pillars 104,106 may further comprise roughened or nanotextured top surfaces 116 to promote hydrophobicity. As illustrated in FIG. 4, the nanotextured top surfaces 116 comprise protruding nanocones 118, in one example. The nanotextured top surfaces 116 may exhibit a roughness ratio r of at least about 1.5, where r is defined below.

The array of larger pillars 104 may be an ordered or disordered array including at least two larger pillars (for a one-dimensional array) and typically at least four larger pillars (for a two-dimensional array). The array may include tens, hundreds or thousands of larger pillars. The smaller pillars 106 distributed among the larger pillars 104 typically have a symmetric arrangement on the surface, although nonsymmetric arrangements are also possible. The smaller pillars 106 may greatly outnumber the larger pillars 104.

If the $T_g$ of the shape memory polymer is above room temperature (e.g., greater than 20° C. or greater than 25° C.), as is preferred, then heating is required to deform the large pillars and to recover the initial configuration of the hierarchically structured surface after deformation. The heating of the shape memory polymer may be carried out using an external heat source, such as a furnace, a heat lamp or a laser. Alternatively, the device may include an internal heater, such as a resistive heater, that can be "built-in" during fabrication. For example, the device may include a conductive film underlying or embedded in the structured surface that can resistively heat the array of large pillars when a voltage is applied to the conductive film. Alternatively, the device may include a patterned conductive film underlying or embedded in the structured surface that defines a number of separate internal heaters, each of which may be independently activated to provide localized heating to one or more of the larger pillars on the structured surface. In one example, the conductive film may be an optically transparent conductive film formed from a conductive oxide, such as indium-tin oxide (ITO).

Geometric Considerations and Apparent Contact Angle

Assuming a two-dimensional droplet interface, the meniscus height referred to above can be obtained theoretically as shown in Equation (1).

$$h_{men} = \frac{\sqrt{2} \cdot (d-a)}{2} \cdot [\sec(\pi - \theta_Y) - \tan(\pi - \theta_Y)] \tag{1}$$

where, as shown in FIG. 2B, $\theta_Y$ is an intrinsic contact angle of the smooth and flat surface (e.g., a smooth and flat FDTS-coated SMP surface), d is a lattice size of the large pillar array, and a is a lateral dimension of the large pillars. Referring to FIG. 1B, $\sqrt{2} \cdot (d-a)$ represents a diagonal distance between corner pillars. Based on predetermined values of $\theta_Y$, d, and a, $h_{men}$ is calculated in one example to be 30 μm. Thus, $h_{ori}$ may be set to be 80 μm, which is larger than $h_{men}$. Accordingly, a liquid (e.g., water) droplet on a structured surface in the undeformed initial configuration wets only the larger pillars. However, in the deformed configuration, $h_{def}$ may be 20 μm, which is smaller than $h_{men}$, such that a liquid droplet wets the deformed larger pillars and top surfaces of the smaller pillars, as illustrated in FIGS. 2C and 2D.

The apparent contact angle of a liquid droplet is defined as the contact angle of the liquid droplet on the hierarchically structured surface. Theoretically, the apparent contact angle ($\theta^*$) is calculated from the intrinsic contact angle ($\theta_Y$) and geometric parameters such as solid fraction and surface roughness ratio. In the Fakir wetting regime, a liquid droplet sits on top of pillars and air pockets. Therefore, the projected area of a droplet is a heterogeneous surface comprising the wetted solid area and the area of air. The wetted solid area divided by the entire projected area (wetted solid area plus air area) is a solid fraction (f). The surface roughness ratio (r) is a ratio between the actual wetted surface area and the projected wetted area. In this work, a liquid droplet is assumed to completely wet the nanotexture on the top surface of the pillars. The apparent contact angle $\theta^*$ is derived from the surface tension balance and is shown in Equation (2).

$$\cos \theta^* = r \cdot f \cdot \cos \theta_Y + f - 1 \tag{2}$$

In a repeating lattice, there are $N_1$ large pillars and $N_2$ small pillars, as shown for example in FIG. 1B. The large and small square pillars have the lateral dimensions a and b, respectively, as illustrated in FIG. 1B. Generally speaking, the lateral dimension (or width) b of each of the smaller pillars is less than about 50% of the lateral dimension (or width) a of each of the larger pillars, and the lateral dimension b may be less than about 25% of the lateral dimension a. Typically, the larger pillars have microscale dimensions (e.g., 1 μm≤a≤100 μm). In addition, the lateral dimension b of each of the smaller pillars may be less than about 10% of a lattice size d of the array of larger pillars. Accordingly, the number ($N_2$) of the smaller pillars may be much higher than that ($N_1$) of the larger pillars.

Figure 1C:
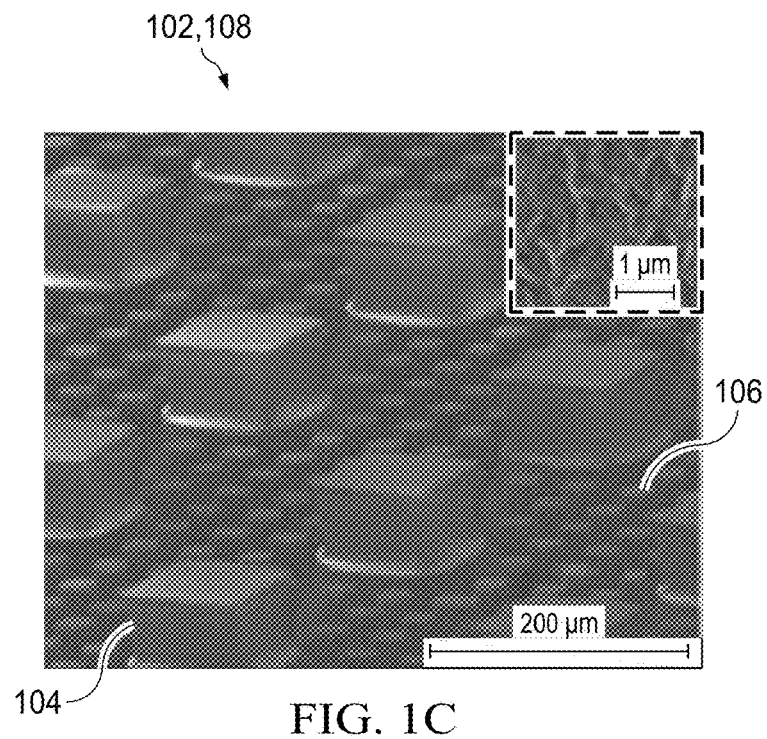
FIGS. 1C and 1D show scanning electron microscope (SEM) images of an exemplary structured surface in an undeformed initial configuration and a deformed configuration, respectively. The inset of FIG. 1C shows the nanotexturing (roughness) of top surfaces of the larger pillars.
Figure 1D:
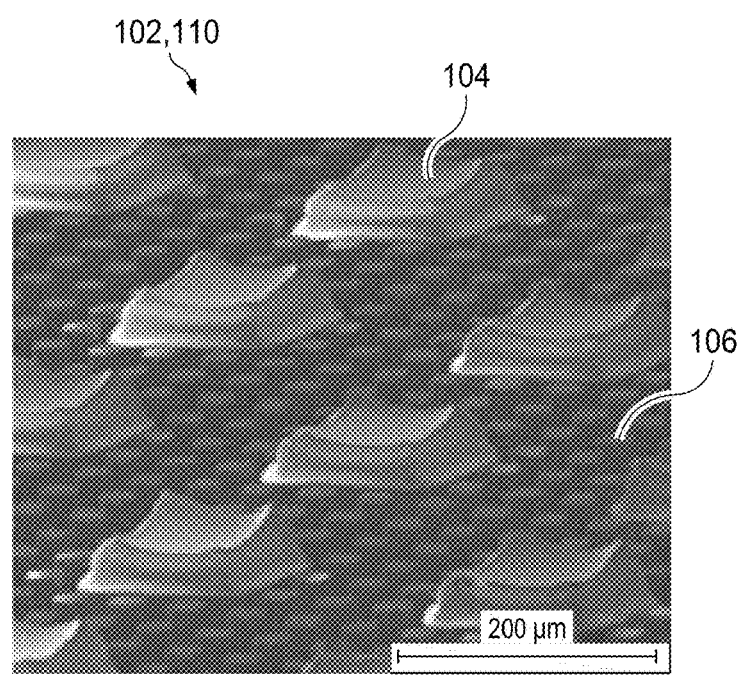

Because of the axial compression, the height of the large pillars is reduced to $h_{def}$, and lateral dimension of the large pillar base (c) becomes larger due to the Poisson effect, as shown in the SEM image of FIG. 1D. The solid fractions of a structured surface in the undeformed initial configuration and the deformed configuration, $f_{ori}$ and $f_{def}$ respectively, are written as Equation (3) and Equation (4).

$$f_{ori} = \frac{N_1 \cdot a^2}{d^2} \quad (3)$$

$$f_{def} = \frac{N_1 \cdot c^2 + N_2 \cdot b^2}{d^2} \quad (4)$$

The roughness ratio on the top surface of the pillars ($r_{ori}$) originating from the nanotexture is calculated by equating the measured apparent contact angle of a liquid droplet on the structured surface ($\theta_{ori}$) and $\theta_Y$, as shown in Equation (5). The roughness ratio attributable to the nanotexturing is assumed to be uniform over the surface, which can be verified by investigating SEM images.

$$r_{ori} = \frac{[(\cos\theta^*_{ori} + 1)/f_{ori} - 1]}{\cos\theta_Y} \quad (5)$$

In addition, the sidewall of compressed large pillars is assumed to be vertical and smooth since, during fabrication (discussed below), black silicon (bSi) is not formed on sidewalls, but only on top surfaces due to the vertical etching nature of the bSi process. A liquid droplet on deformed large pillars wets the top surface and also side surfaces (sidewalls) of the large pillars. This creates another fraction of roughness in addition to that from the nanotexture, which is shown in Equation (6).

$$r_{def} = r_{ori} + \frac{4 \cdot N_1 \cdot a \cdot h_{def}}{N_1 \cdot c^2 + N_2 \cdot b^2} \quad (6)$$

From the SEM images of FIGS. 1C and 1D, the dimensions of pillars are measured and the theoretical apparent contact angles are calculated using Equations (2)-(6). Table 1 below summarizes all measured and calculated parameters for the exemplary structured surfaces.

TABLE 1

Summary of solid fraction (f), roughness ratio (r), and apparent contact angles (measured and theoretical (θ*)) of exemplary structured surfaces in the initial and deformed configurations with and without nanotexturing.

| Sample | Configuration | f | r | Measured θ* | Theoretical θ* |
|---|---|---|---|---|---|
| Smooth | Initial | 0.10 | 1.00 | 158.2° | 160.8° |
|  | Deformed | 0.46 | 1.19 | 141.1° | 140.0° |
| Nano-textured | Initial | 0.10 | 1.58 | 165.4° | — |
|  | Deformed | 0.46 | 1.77 | 148.2° | 151.5° |

Manipulation of a Liquid Droplet on a Hierarchically Structured Surface

Figure 5:
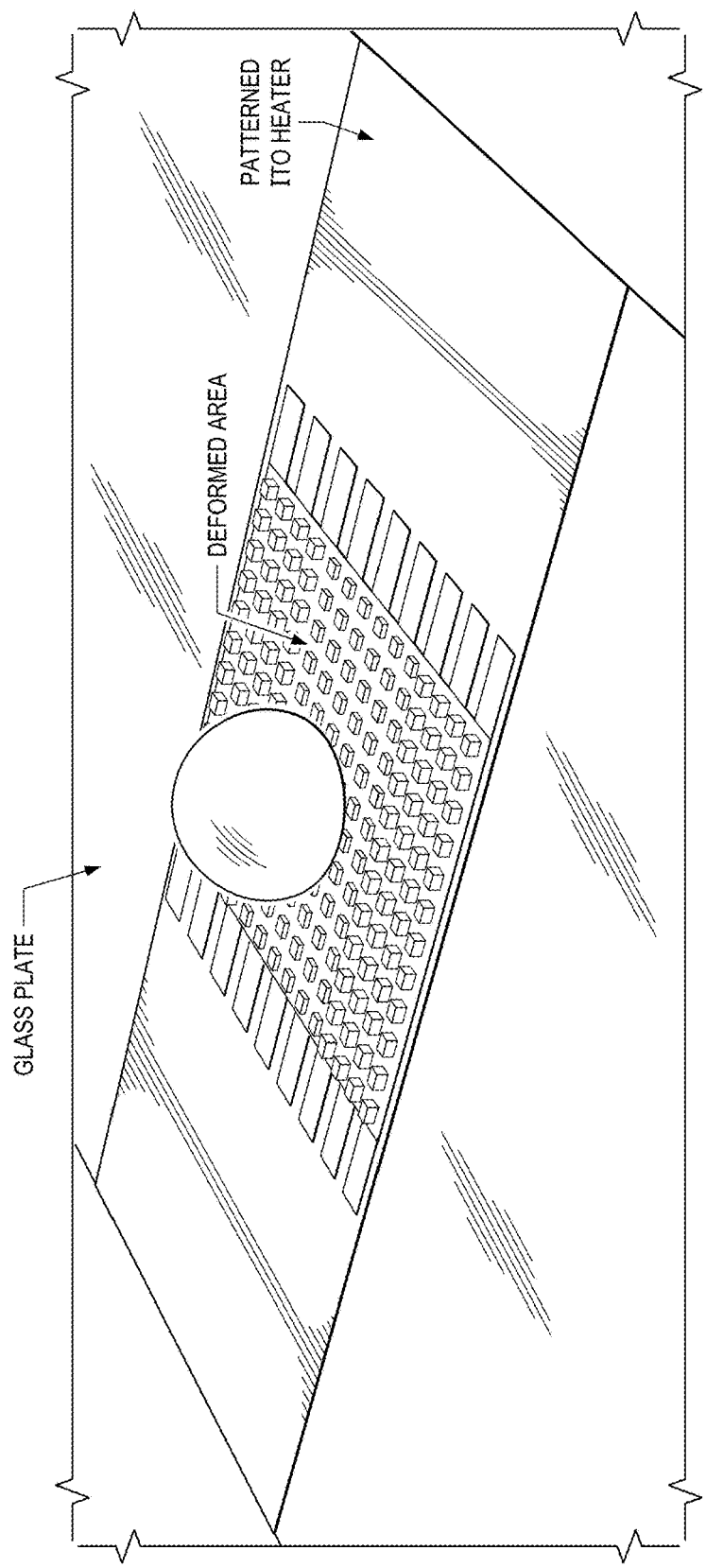
FIG. 5 is a schematic of a device comprising a hierarchically structured surface with an internal heater for resistive heating.
Figure 6B:
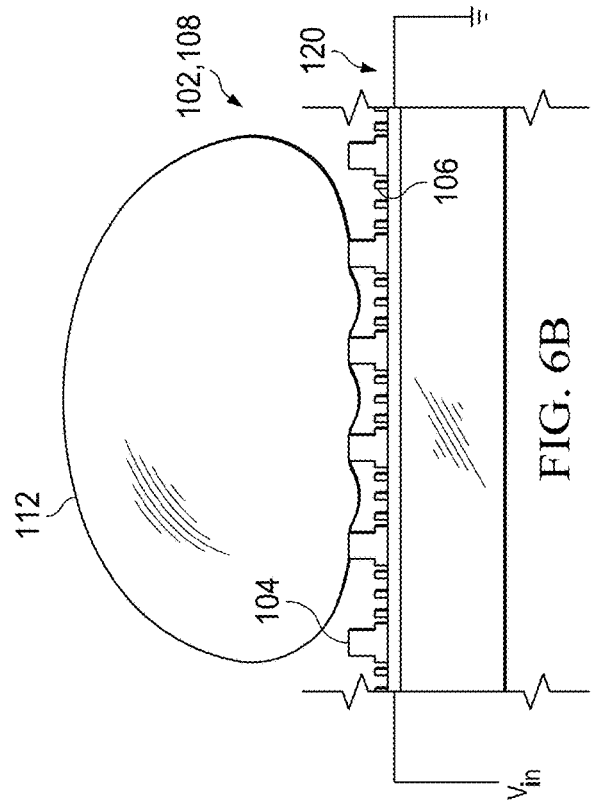
FIGS. 6A and 6B are schematics showing a liquid droplet disposed on the structured surface of FIG. 5, before and after heating (and shape recovery), respectively.
Figure 6A:
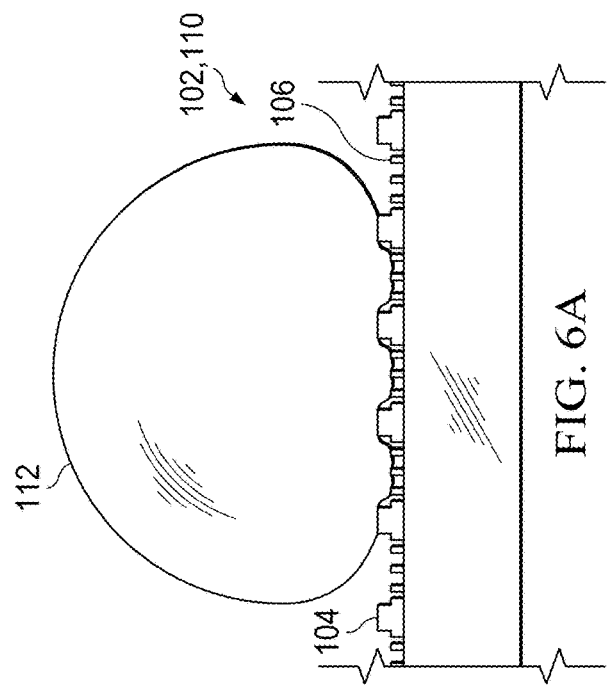

To demonstrate the dynamic tuning of apparent contact angles, a device comprising a hierarchically structured surface as described above is fabricated with a built-in heat source, as shown in the schematics of FIG. 5 and FIGS. 6A and 6B. To construct the device, a transparent conductive layer (e.g., an ITO film) is deposited and patterned on a glass slide to define a single internal heater of an appropriate size to promote uniform heating of the array of larger pillars. A shape memory polymer (NGDE2 in this example) is cured and shaped between an elastomeric (e.g., PDMS) mold and the internal heater to define the larger and smaller pillars of the structured surface. After fabrication, the larger pillars are axially compressed at a temperature above the $T_g$ such that a water droplet can wet both the larger and smaller pillars simultaneously when placed on the compressed area after cooling. The apparent contact angle of a droplet is investigated during heating of the structured surface using the internal heater. Upon applying 5 W to the internal heater, $T_g$ (~60° C.) is achieved after about five to ten seconds, and the temperature reaches a steady state (~130° C.) after about 30 seconds.

The apparent contact angle significantly increases after shape recovery of the structured surface upon uniform heating. It is experimentally observed that a water droplet gradually loses contact with the smaller pillars, resulting in the gradual reduction of the solid fraction of the structured surface and the increasing apparent contact angle of the droplet. This shows that the water droplet can become a Fakir droplet that exclusively wets the larger pillars.

Interestingly, when the structured surface is heated only to $T_g$ of the shape memory polymer, the dynamic increase in the apparent contact angle is negligible. This suggests that the shape recovery of the larger pillars is not a sole reason for the significant increase in the apparent contact angle. The dynamic tuning of apparent contact angles is believed to be achieved by shape recovery of the shape memory polymer aided by thermal energy input. Accordingly, it may be beneficial to heat the structured surface to temperatures significantly above $T_g$, such as at least about $T_g+20°$ C., or at least about $T_g+40°$ C., or at least about $T_g+60°$ C.

Thus, a method of manipulating a liquid droplet on a surface comprises applying the liquid droplet to a structured surface, which, as described above, comprises an array of larger pillars and a number of smaller pillars distributed among the larger pillars, where each of the larger pillars comprises a shape memory polymer having a glass transition temperature $T_g$. Referring again to FIG. 6A, the structured surface 102 is in a deformed configuration 110 where the larger pillars 104 are compressed relative to an undeformed initial configuration 108 of the structured surface 102 (shown in FIG. 6B), and the liquid droplet 112 contacts the structured surface 102 at a first apparent contact angle, which corresponds to a first wettability of the structured surface 102 in the deformed configuration 110. FIG. 2D discussed previously provides a close-up view of the relationship between a liquid droplet 112 and a portion of an exemplary structured surface 102 in the deformed configuration 110.

Referring now to FIG. 6B, the structured surface 102 (and thus the shape memory polymer) is heated at or above the $T_g$ so as to recover the undeformed initial configuration 108. In other words, the larger pillars 104 exhibit shape recovery to an uncompressed permanent shape. The heating may be carried out using an internal heater 120, as shown in the figure, or with an external heater such as a furnace, heat lamp, laser or other heat source. Due to the heat-induced shape recovery of the larger pillars 104, the liquid droplet 112 contacts the structured surface 102 at a second apparent contact angle, which is larger than the first apparent contact angle obtained while the structured surface 102 was in the deformed configuration (temporary shape) 110. The second apparent contact angle corresponds to a second wettability of the structured surface 102 in the permanent shape 108, which is lower than the first wettability of the structured surface 102 in the temporary shape 110. A lower surface wettability is associated with a higher contact angle of a droplet on the surface 102. Thus, a droplet may be manipulated on the structured surface 102.

The method of droplet manipulation may further comprise, prior to applying the liquid droplet 112 to the structured surface 102, heating the structured surface 102 at or above the $T_g$ and compressing the larger pillars 104, as shown in FIG. 3A, such that the structured surface 102 adopts the deformed configuration 110. The structured surface 102 is then cooled to a temperature below the $T_g$, as shown in FIG. 3B, in order to rigidize the structured surface 102 in the deformed configuration 110. The cooling may entail active cooling (e.g., flow of a cooling gas over the structured surface 102) or passive cooling (e.g., cessation of heating).

The structured surface 102 employed in the method of droplet manipulation may have any or all of the characteristics described in this disclosure, including pillars comprising a shape memory polymer, a hydrophobic coating on the pillars, nanotexturing of top surfaces of the pillars, and/or other features, where "pillars" may refer to one or both of the large pillars 104 and the small pillars 106.

Nanotexturing of top surfaces of the pillars may have an effect on the dynamic tuning of apparent contact angles. A structured surface including pillars that have nanotextured top surfaces ("nanotextured sample") is compared with a structured surface including pillars that have smooth top surfaces ("smooth sample"). Referring to FIG. 7, on the smooth sample, the apparent contact angle of a water droplet after shape recovery of the larger pillars increases but fails to reach the value measured on the structured surface prior to deformation ($\theta^*=158.2°$ in Table 1). In contrast, the complete dynamic transition of a water droplet with almost a 20° contact angle change is achieved on the nanotextured sample, and the transition is more gradual than that of the smooth sample. These results indicate that the nanotexturing has a positive influence on the dynamic tuning of apparent contact angles by lowering the required thermal energy input for the complete transition.

Motion of a Liquid Droplet on a Hierarchically Structured Surface

Figure 8A:
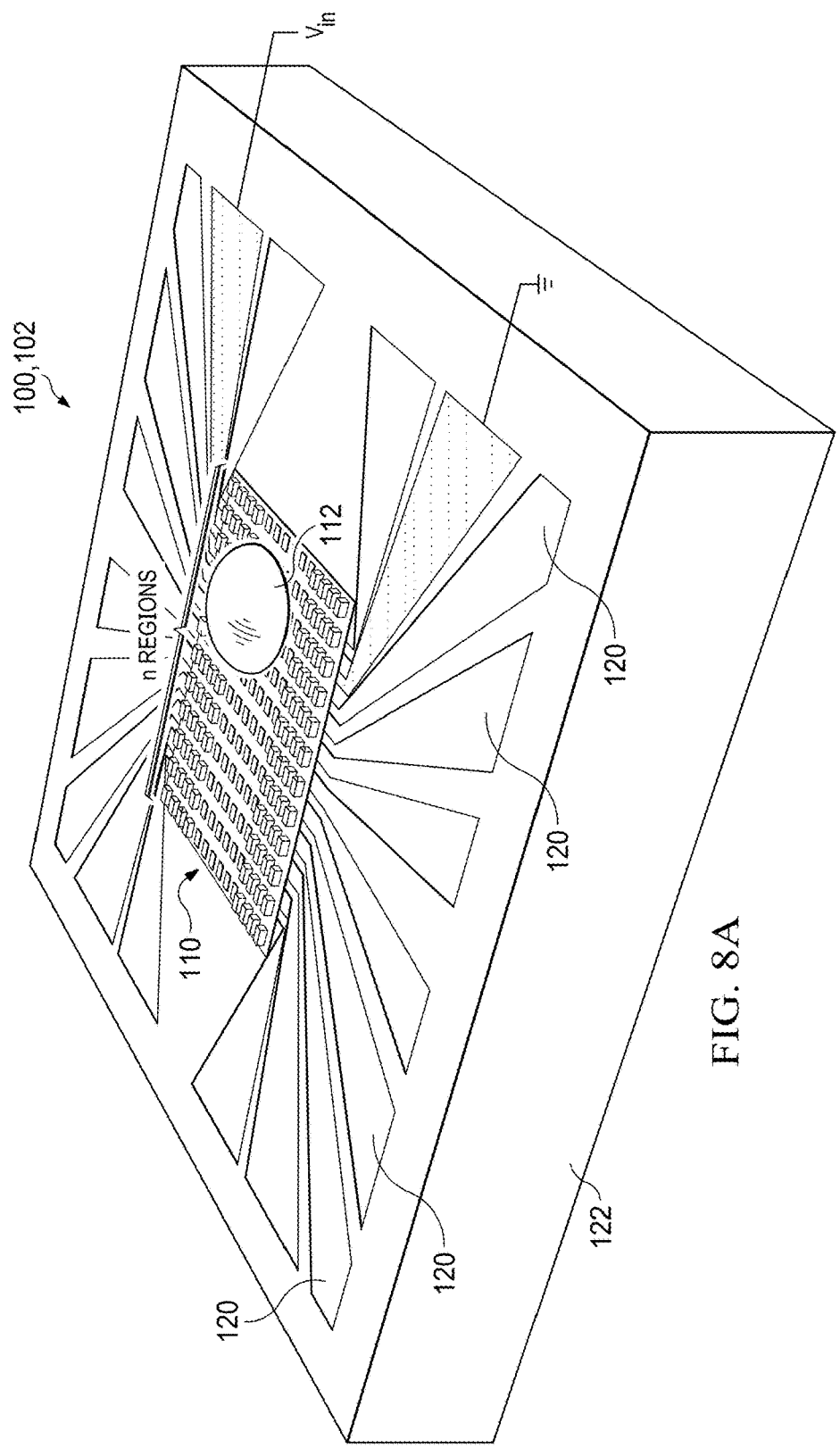
FIG. 8A shows motion of a droplet on a hierarchically structured surface heated by separate and independently-controllable internal heaters.
Figure 8B:
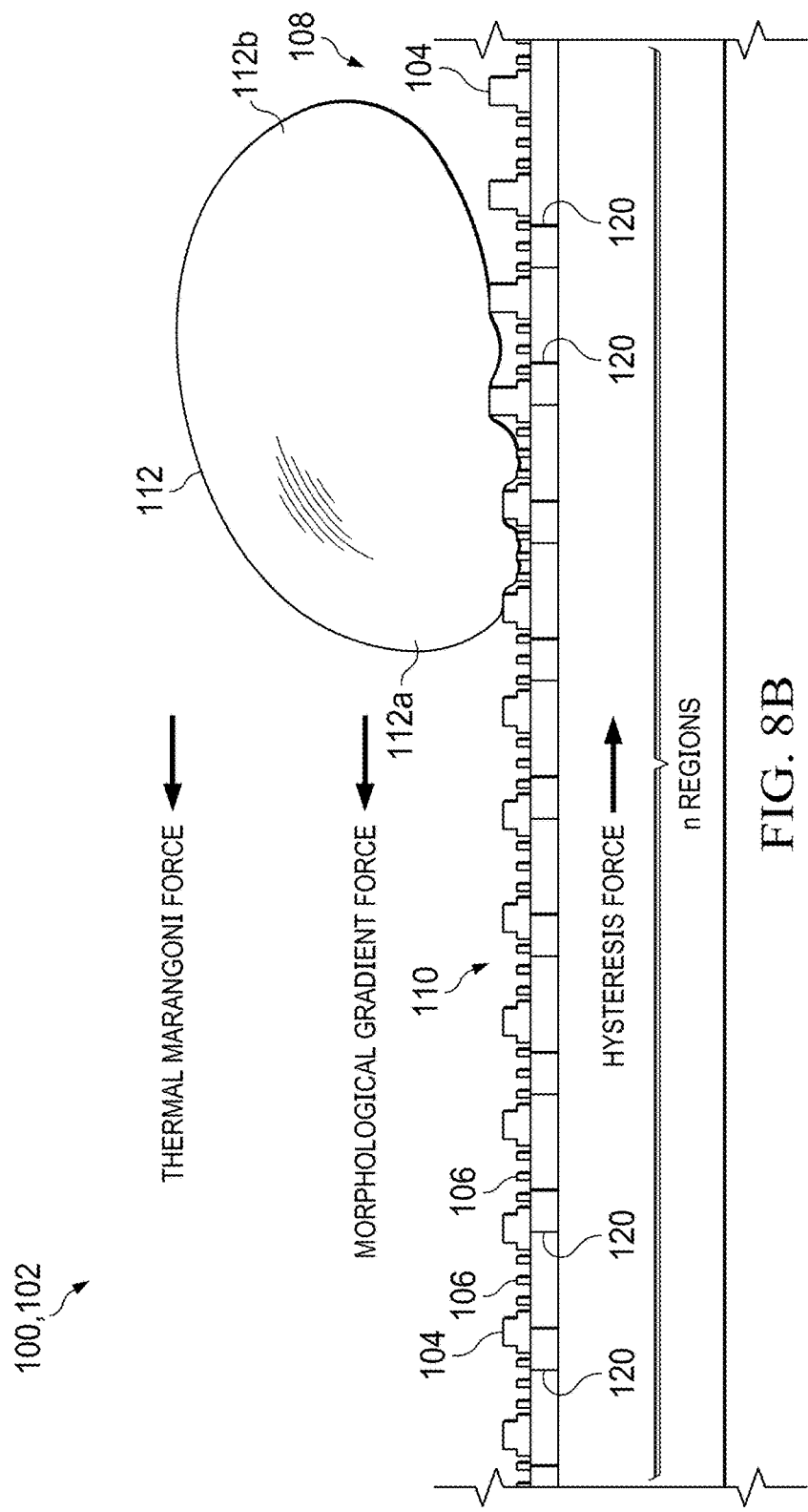
FIG. 8B illustrates the competing forces involved in initiating droplet motion on a structured surface.

To demonstrate motion of a droplet on a structured surface 102, a transparent conductive layer (e.g., an ITO film) is deposited on a glass slide 122 and patterned into a number of separate internal heaters 120 that can be activated independently, as illustrated in FIGS. 8A and 8B. The internal heaters 120 are independently programmable for spatially gradual and local shape recovery of the larger pillars 104, enabling different local contact angles between the droplet 112 and the structured surface 102. Since heat dissipation occurs through the SMP pillars, the local heating generates temperature gradients over the SMP surface. Therefore, driving forces to manipulate droplets may include not only a morphological gradient force induced by the local shape recovery of the larger pillars but also a force caused by thermal gradients.

A method of moving a liquid droplet over a surface comprises applying a liquid droplet 112 to a structured surface 102, which, as described above, comprises an array of larger pillars 104 and a number of smaller pillars 106 distributed among the larger pillars 104, where each of the larger pillars 104 comprises a shape memory polymer having a glass transition temperature $T_g$. The structured surface 102 is in a deformed configuration 110 where the larger pillars 104 are compressed relative to an undeformed initial configuration 108 of the structured surface 102. The structured surface 102 includes n regions configured for independent heating, where each of the n regions includes one or more of the larger pillars 104. Then regions may be arranged in an array, which may be ordered or disordered. The array may be a one-dimensional array where n is at least 2 or a two-dimensional array where n is at least 4; in either case, n may be as large as 10, as large as 100, as large as 1,000, or as large as 10,000. The liquid droplet 112 comprises a rear portion 112b in contact with a first of the n regions and a leading portion 112a forward of the rear portion 112b. The first of the n regions is locally heated at or above the $T_g$, thereby inducing the larger pillar(s) 104 in the first region to exhibit shape recovery to an uncompressed shape, such that the rear portion 112b of the liquid droplet 112 decreases contact with the structured surface 102. Accordingly, the apparent contact angle of the rear portion 112b of the liquid droplet 112 becomes greater than an apparent contact angle of the leading portion 112a of the liquid droplet 112, producing a morphological gradient force, as illustrated in FIG. 8B. When combined with the thermal gradient from the localized heating (thermal Marangoni force), the morphological gradient force can overcome an opposing hysteresis force and induce motion of the droplet 112 on the structured surface 102. The liquid droplet 112 thereby advances on the structured surface 102 such that the rear portion 112b contacts a second of the n regions. The local heating is carried out sequentially for a predetermined pattern of adjacent regions (e.g., for each of the n regions or for some fraction of the n regions) to advance the liquid droplet 112 along a predetermined path across the structured surface 102. If the array of n regions is a one-dimensional array, then the predetermined pattern may be a linear pattern, as shown for example in FIGS. 8A and 8B; thus, the predetermined path of the liquid droplet across the structured surface may be a linear path. If the array of n regions is a two-dimensional array, then the predetermined pattern may be a linear or a nonlinear pattern, as shown for example in FIGS. 8C-8F; in this case, the predetermined path of the liquid droplet across the structured surface may be a linear or a non-linear path. The array of n regions may be an ordered (regular) or a disordered array.

Figure 8C:
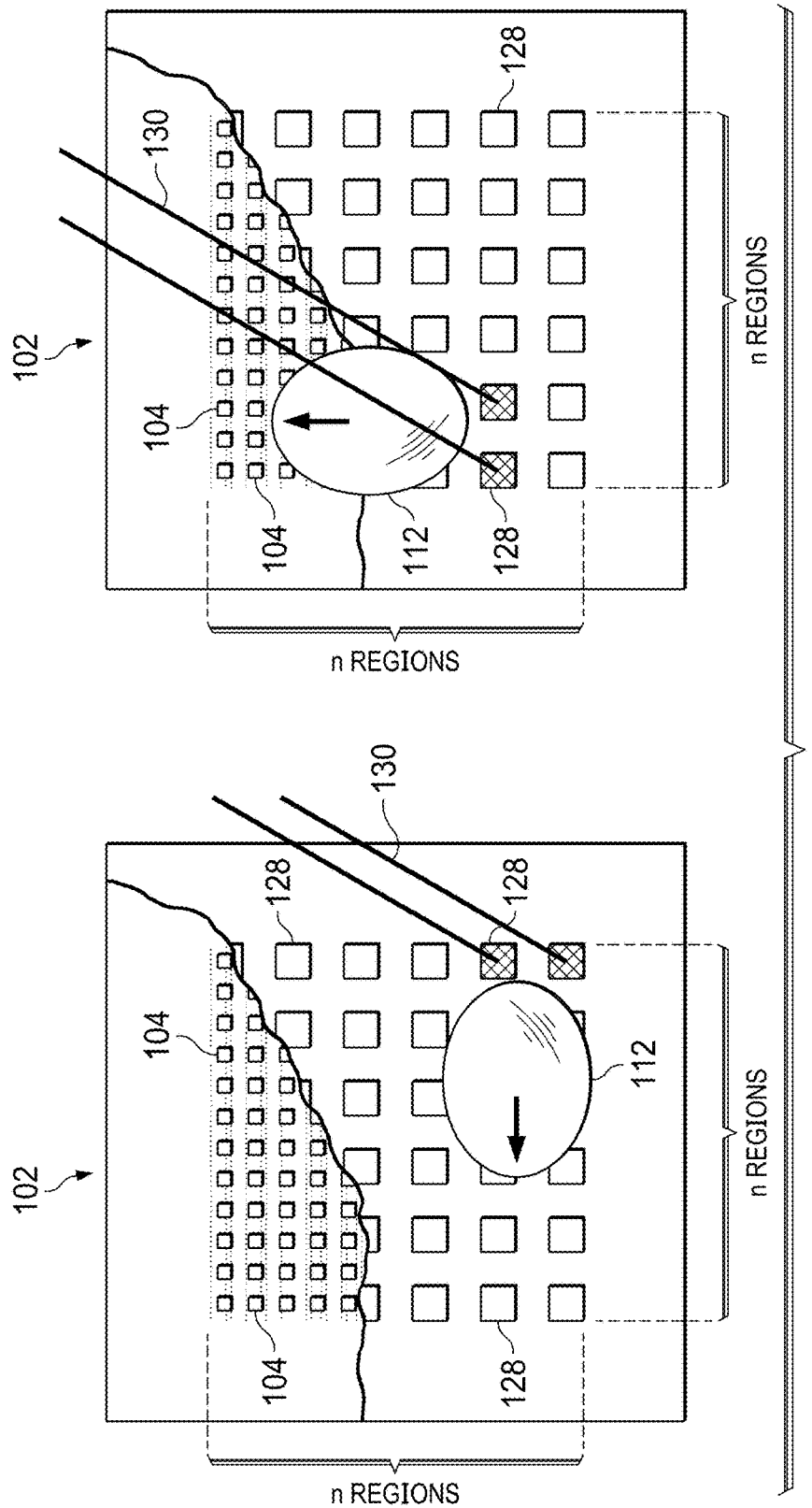
FIG. 8C shows top-view schematics of motion of a droplet on a hierarchically structured surface heated by a laser, where light-absorbing particles may optionally be embedded within the structured surface.
Figure 8D:
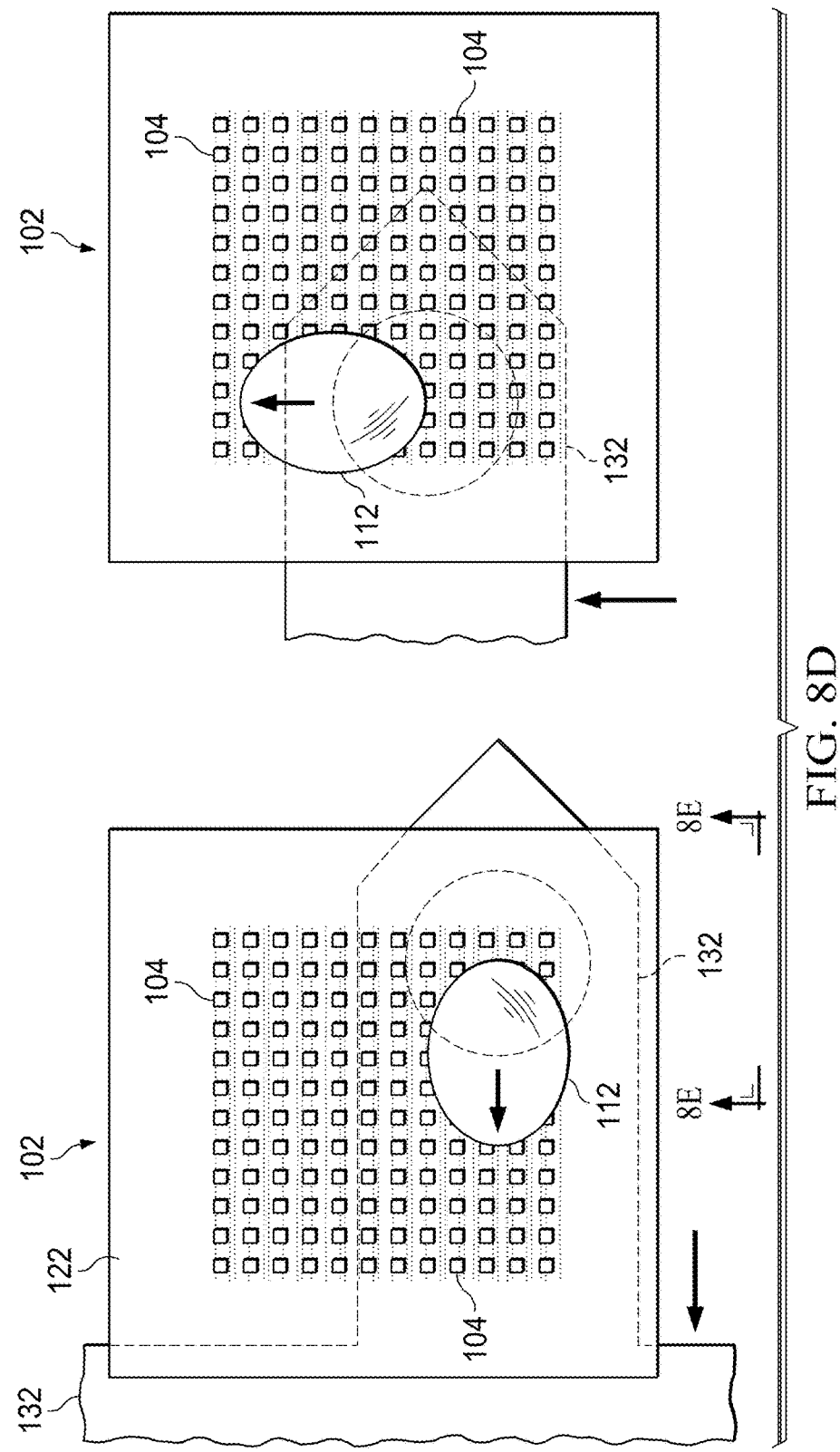
FIG. 8D shows top-view schematics of motion of a droplet on a hierarchically structured surface heated by a stencil moving along a backside of the structured surface.
Figure 8E:
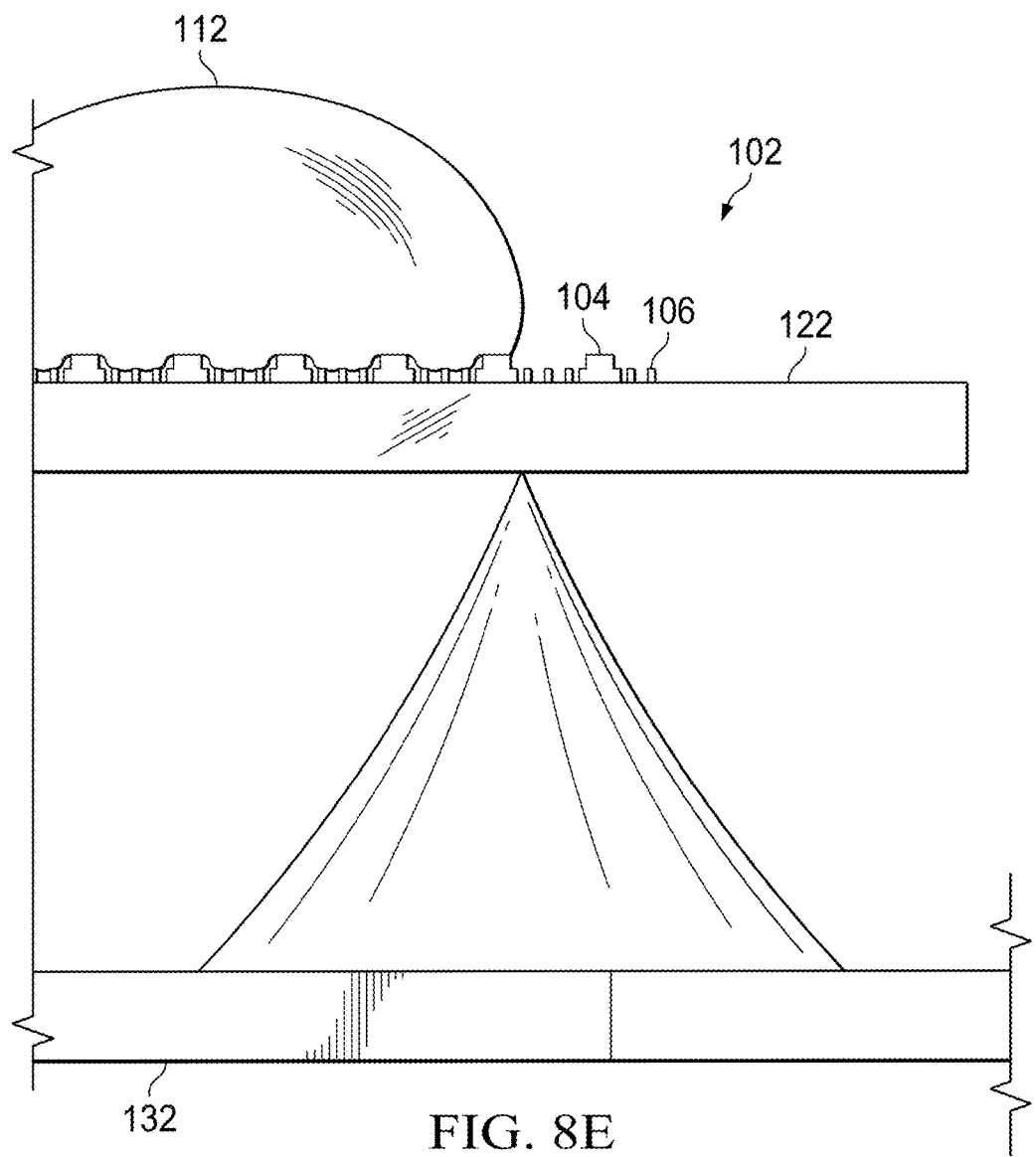
FIG. 8E shows a side view of the heated stencil in contact with the backside of the structured surface.
Figure 8F:
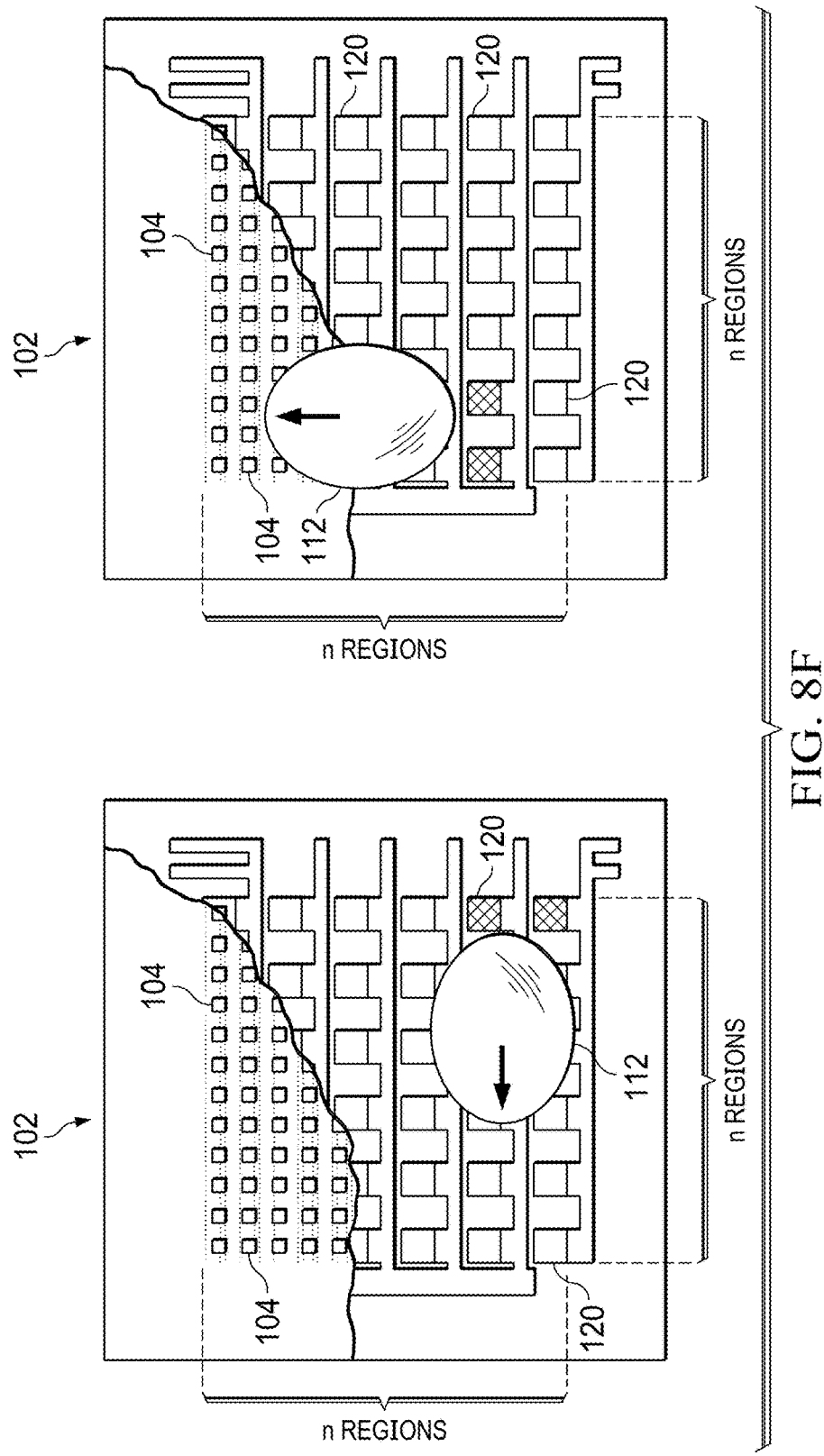
FIG. 8F shows top-view schematics of motion of a droplet on a hierarchically structured surface heated by internal heaters (e.g., resistive heaters) arranged in a two-dimensional array.

The local heating may be carried out using an external heater 130 comprising a laser beam or another localized external heat source that may be directed to sequentially heat the adjacent regions, as shown in FIG. 8C. In this case, to facilitate heating along the predetermined path, light-absorbing particles 128 (e.g., carbon black) may be embedded within the n regions of the structured surface 102. In another example of external heating, a heated stencil 132 configured to contact a backside of the structured surface 102 may be moved along a suitable backside path to provide the requisite localized heating and induce motion of the droplet 112, as illustrated in FIGS. 8D and 8E. Also or alternatively, the local heating may be carried out using n internal heaters 120 arranged in an array where the n internal heaters 120 are in contact with the n regions, as shown for example in FIG. 8F. In this case, the local heating may entail activating an $i^{th}$ of the n internal heaters 120 to locally heat the adjacent region, where $1 \leq i \leq n$. The internal heaters 120 may comprise resistive (or joule) heaters as described above in contact with electrodes for independent activation.

The structured surface 102 employed in the above-described method may have any or all of the characteristics described in this disclosure, including pillars comprising a shape memory polymer, a hydrophobic coating on the pillars, nanotexturing of top surfaces of the pillars, and/or other features, where "pillars" may refer to one or both of the large pillars 104 and the small pillars 106.

Theory: Force Balance for Droplet Motion

The surface tension between water and air depends on the temperature of a water droplet, and thus the surface temperature gradient creates a surface tension gradient on the droplet base. Internal water flow, also called Marangoni flow, is induced inside the water droplet due to the surface tension gradient. What may be referred to as a thermal Marangoni force is a force driven from the flow that causes a droplet to move forward, and it is expressed in relationship (7). R is the radius of droplet base, γ is water/air surface tension, and x is displacement in parallel with the temperature gradient.

$$F_T \sim R^2 \cdot \frac{d\gamma}{dx} \quad (7)$$

In addition, by well controlled local heating of the structured surface, a rear portion of a liquid droplet may be supported by shape-recovered larger pillars while the leading portion of the droplet is supported by compressed larger pillars. The different solid fraction and apparent contact angles between the rear and leading portions of the liquid droplet cause an imbalance of Laplace pressure inside the droplet. If the rear portion of the droplet has a larger apparent contact angle, the unbalanced pressure generates a force to move the droplet forward. The force from this morphological gradient, which causes an unbalanced pressure, is written in relationship (8), where $\theta_F^*$ and $\theta_R^*$ are the apparent contact angles of a droplet at the leading (or front) and rear portions, respectively.

$$F_M \sim R \cdot \gamma \cdot (\cos \theta_F^* - \cos \theta_R^*) \quad (8)$$

There is a third force known as the hysteresis force involved in the interaction between a droplet and the structured surface, and this force may provide a significant resistance to droplet manipulation. To describe the hysteresis force, an advancing contact angle is defined as the maximum contact angle before three phase contact line (TCL) advancing while a receding contact angle is the minimum contact angle before TCL receding. Contact angle hysteresis (CAH) is the difference between advancing and receding contact angles, and a hysteresis force is the pinning force defined via CAH. The hysteresis force of a droplet on a uniform surface is a function of front and rear pinning forces, as shown in relationship (9).

$$F_H \sim R \cdot \gamma \cdot (\cos \theta_{rec} - \cos \theta_{adv}) \quad (9)$$

$\theta_{adv}$ and $\theta_{rec}$ are advancing and receding contact angles of a droplet respectively. It is important to note that a droplet experiencing a morphological gradient sits on the compressed and uncompressed large pillars simultaneously with different wettability; therefore, the hysteresis force may not be simply stated as relationship (9). The CAH on nanotextured pillars in uncompressed and compressed shapes is measured by what is known in the art as the tilting-plate method. The CAH on a flat SMP surface is measured using the sessile drop method, which is also known in the art. Table 2 summarizes the CAH values. As expected, a FDTS-coated flat SMP surface is highly adhesive.

TABLE 2

Advancing and receding contact angles and corresponding contact angle hysteresis of a water droplet on a flat SMP surface, a structured surface in the undeformed initial configuration, and a structured surface in the deformed configuration. All pillars are nanotextured and FDTS-coated.

|  | $\theta_{adv}$ | $\theta_{rec}$ | CAH |
|---|---|---|---|
| Flat surface | 115.9° | 33.7° | 82.2° |
| structured surface initial configuration | 175.5° | 138.7° | 36.8° |
| structured surface deformed configuration | 162.1° | 100.5° | 61.6° |

The total net force applied to a droplet can be determined by adding the three forces described above, as shown in Equation (10) and as illustrated in FIG. 8B.

$$F_{tot} = F_T + F_M - F_H \quad (10)$$

If the total net force ($F_{tot}$) is greater than zero, a droplet can move. However, if $F_{tot}$ is equal to or smaller than zero, a droplet does not move. It is noteworthy that relationships (7), (8), and (9) and Equation (10) are valid only at the onset of droplet motion and not necessarily valid during droplet motion. Therefore, the balance between the three forces provides an indication of whether or not the hierarchically structured surface can initiate the motion of a droplet.

Experimental Studies of Competing Forces for Droplet Motion

Figure 9:
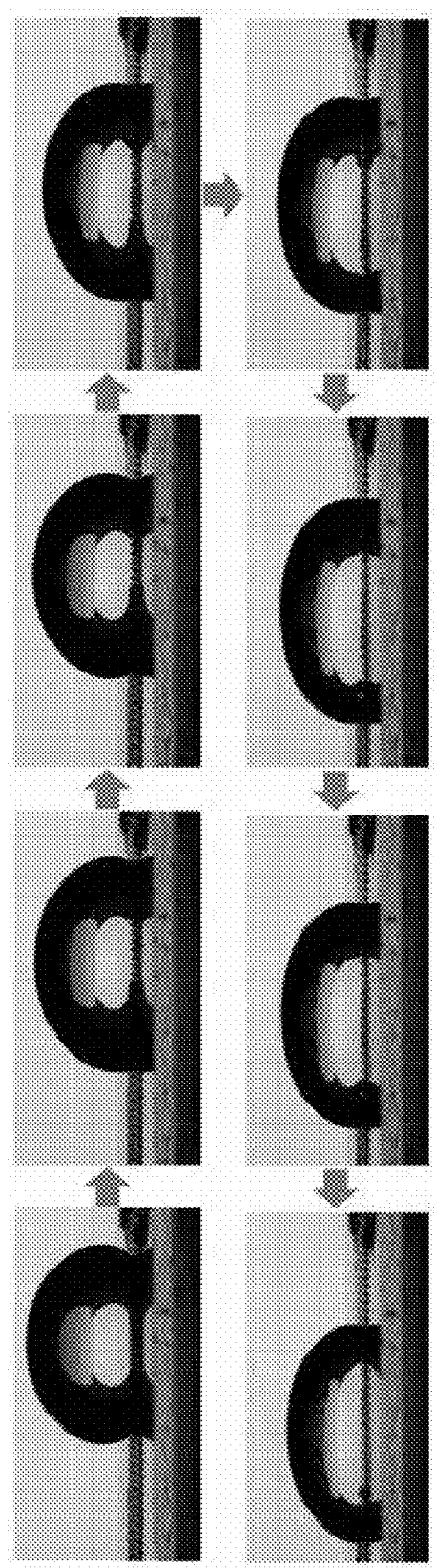
FIG. 9 shows a series of still frames of a water droplet driven by thermal Marangoni and morphological gradient forces that overcome the hysteresis force.

FIG. 9 shows a series of still frames of a water droplet driven by thermal Marangoni and morphological gradient forces that overcome the hysteresis force. The motion can be characterized as repetitive spreading and shrinking of a droplet. When a droplet experiences the morphological gradient and the thermal Marangoni effect, the shape of the droplet is altered to balance the forces by decreasing the rear apparent contact angle and increasing the front contact apparent angle. Once the front apparent contact angle exceeds the front advancing contact angle, the droplet moves forward, however, the rear of a droplet is still pinned, which causes spreading of the droplet. After the droplet spreads, the rear apparent contact angle becomes smaller than the rear receding contact angle. At this moment, the droplet begins to shrink and the rear of droplet shows stick and slip motion. It is observed that the droplet spreading occurs ahead of the droplet shrinking. This is because the rear pinning force is larger than the front pinning force of a water droplet on the hierarchically structured surface.

To study the influence of the surface morphological gradient force on droplet manipulation compared to that of thermal Marangoni force, three control experiments are performed. The first control experiment is done on a flat and smooth SMP surface coated with FDTS. A temperature gradient is formed over the surface with a pre-dispensed droplet (R≈3 mm). However, no meaningful droplet motion is observed. This result suggests that the thermal Marangoni force induced by a given temperature gradient cannot overcome the hysteresis force to drive a water droplet (R≈3 mm) on flat SMP surface. Unlike droplet manipulation on flat hydrophilic surface, droplet manipulation on a hydrophobic surface using thermal Marangoni force is often challenging because the base radius of the droplet becomes significantly small on a hydrophobic surface compared to a hydrophilic surface.

The second control experiment is done on a hierarchically structured surface in the undeformed initial configuration with a pre-dispensed droplet and the same temperature gradient over the surface. The result demonstrates that the thermal Marangoni force is not sufficiently high to overcome the hysteresis force to move the droplet (R≈3 mm), although the CAH on the structured surface in the undeformed initial configuration is even lower than above. Therefore, the morphological gradient is regarded to play a key role in overcoming the CAH for droplets in this size range. It is worthwhile to note that a large droplet (e.g., R greater than about 3 mm) may move solely by the thermal Marangoni force ($F_T$) without the morphological gradient force ($F_M$) since $F_T$ is a quadratic function of R, but $F_M$ and $F_H$ are linear functions of R, as shown in relationships (7), (8), and (9). For R of about 3 mm and below, the morphological gradient force is also needed.

The third control experiment is done on a hierarchically structured surface with a pre-defined surface morphological gradient. To prepare this sample, a structured surface is deformed and a part of the deformed region is recovered with localized heating and subsequent cooling, forming a shape recovered area adjacent to a deformed area. A droplet is then dispensed on the structured surface so as to be positioned on the shape recovered area and the deformed area. As expected, a rear portion of the droplet wets only top surfaces of the larger pillars in the shape recovered area, but the leading portion of the droplet wets both the larger and smaller pillars in the deformed area. This heterogeneous wetting creates a morphological gradient force that drives the droplet forward. Even after the droplet loses the surface morphological gradient, the droplet is observed to move forward with inertia. However, when the droplet loses the kinetic energy due to the hysteresis force, the droplet becomes stationary.

Droplet Manipulation on a Tilted Substrate

The total net force to drive a water droplet is experimentally measured by matching the total net force to a gravitational force on a tilted substrate. A structured surface on an ITO heater patterned glass substrate is placed on a Dual-Axis Goniometer (THORLABS). After a droplet is placed on the structured surface in the deformed configuration, the substrate is tilted by rotating the goniometer knob. Once the substrate reaches a target tilting angle, an internal heater located immediately behind the droplet is activated to move the droplet uphill. A critical tilting angle ($\theta_{crt}$) is defined as the lowest tilting angle on which the droplet does not move, since gravitational force equals the total net force. At the threshold tilting angle, the total net force and the gravitational force are related as shown in Equation (11).

$$F_{tot} = m \cdot g \cdot \sin \theta_{crt} \qquad (11)$$

The experimentally measured $\theta_{crt}$ lies around 3.5°, and the corresponding driving force can be quantified as 3.6 dyne.

Fabrication of a Hierarchically Structured Surface

Figure 10A:
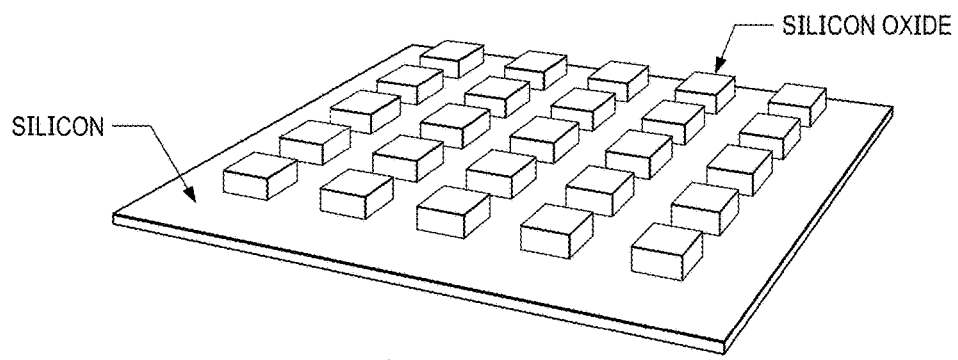
FIGS. 10A-10F show steps in a process that may be employed to fabricate an exemplary hierarchically structured surface.
Figure 10B:
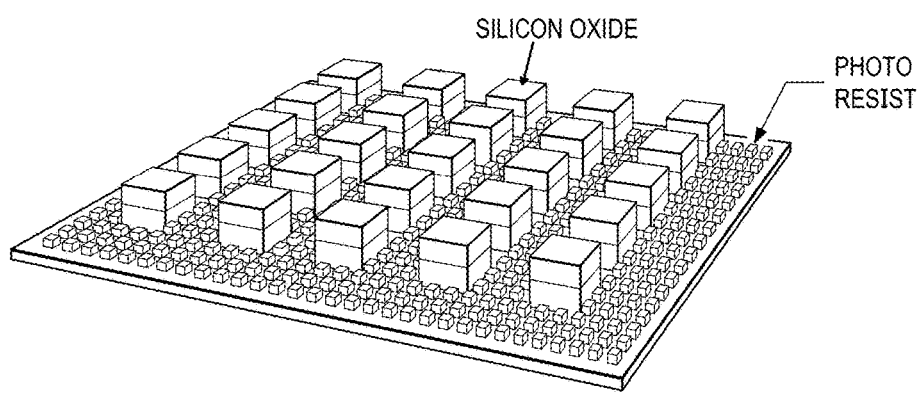

An exemplary process to fabricate the hierarchically structured surface is depicted in FIG. 10A-10F and described here. Fabrication may include polydimethylsiloxane (PDMS) and SMP molding processes, and may start with creation of a Si pillar array as an original master for molding. A thermally grown $SiO_2$ layer (1 µm in thickness) on a Si substrate (500 µm in thickness) is patterned to form a $SiO_2$ masking layer. The patterning is carried out using an image reversal technique with AZ5214 photoresist and selective $SiO_2$ etching with buffered oxide etchant (BOE). The large Si pillars are formed using a deep reactive ion etch (DRIE) process (Pegasus STS DRIE) with the $SiO_2$ masking layer, as shown in FIG. 10A. Photolithography and a second DRIE process are used to define the small Si pillars distributed among the large Si pillars, as shown in FIG. 10B. The lithographically patterned photoresist layer and the previously patterned $SiO_2$ layer are used as masking layers for the second DRIE process. After the second DRIE process, the removal of masking layers, including the photoresist and $SiO_2$, by acetone and BOE completes the fabrication of the Si master.

Figure 10C:
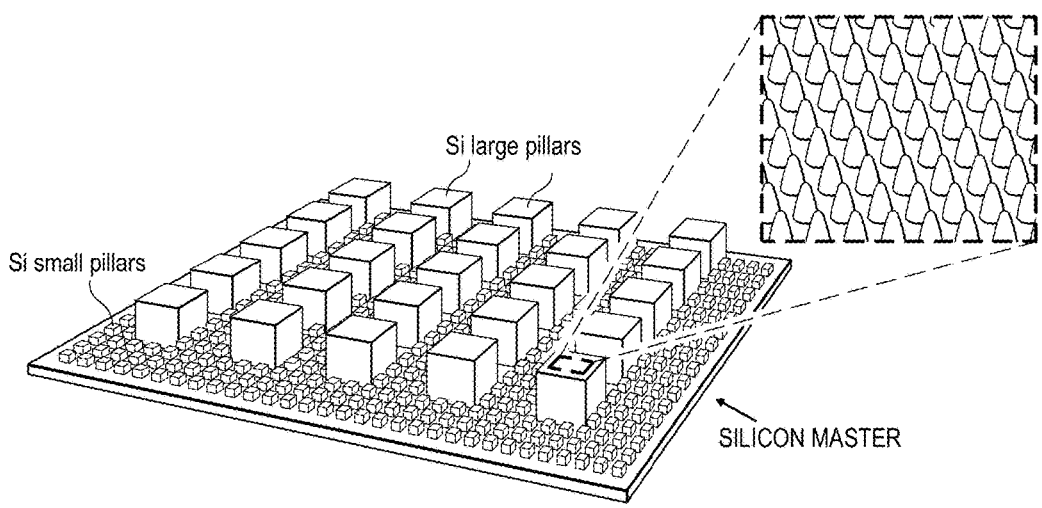
Figure 10D:
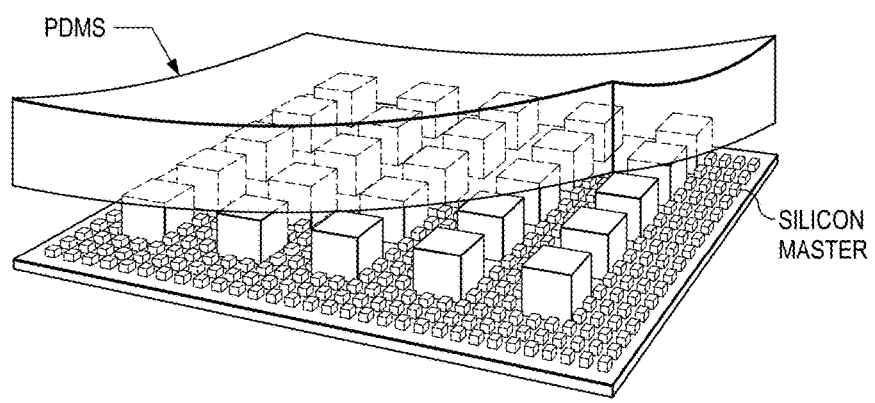
Figure 10E:
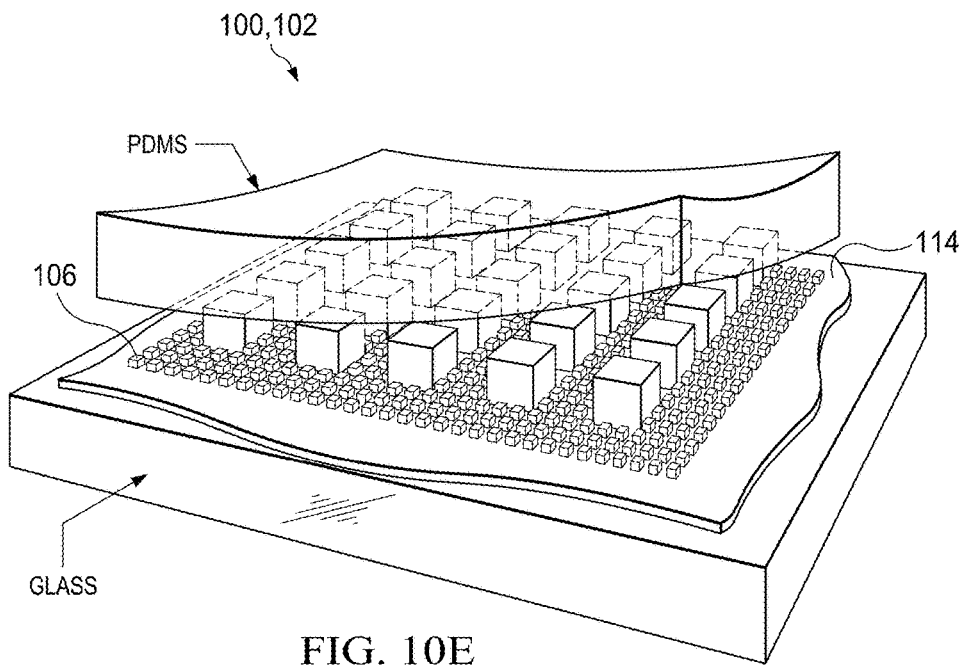
Figure 10F:
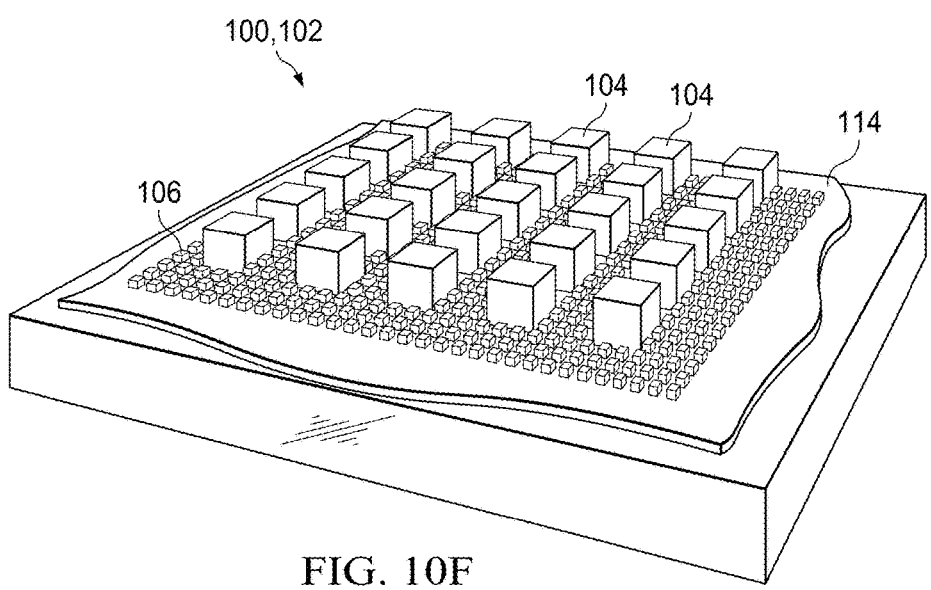

To enable nanotexturing of top surfaces of the Si pillars, a three step black silicon (bSi) process (PlasmaTherm ICP RIE) is performed, as shown schematically in FIG. 10C. The process starts with formation of a thin $SiO_2$ film using an $O_2$ plasma and then incomplete etching of the thin $SiO_2$ film using a $CHF_3$ plasma to form randomly scattered $SiO_2$ islands. The islands are used as etch masks for a successive Si etching step, during which nanocones can be formed on the top surfaces of the Si pillars by selective etching with a $Cl_2$ and Ar plasma.

An anti-stick coating layer of heptadecafluorotetrahydrodecyl-trichlorosilane (FDTS) may be deposited on the fabricated Si master in a molecular vapor deposition (MVD) chamber to ease successive polymer casting processes. The hierarchically structured surface is fabricated via two separate casting processes using PDMS and a shape memory polymer (SMP), as shown schematically in FIGS. 10D and 10E. PDMS and SMP precursors are fully degassed in a vacuum desiccator before curing in a convection oven. First, a PDMS precursor is poured into the Si master and cured at 60° C. for 120 minutes to form a PDMS mold with small and large holes. Next, a SMP precursor is casted between a flat smooth indium tin oxide (ITO) coated glass slide and the PDMS mold at 100° C. for 120 minutes. The ITO film is optically transparent and electrically conductive and may be used for resistive heating of the structured surface. To allow spatially selective heating of SMP pillars, a glass slide with patterned ITO heaters is used during the SMP casting step. Lithographical patterning of a photoresist and a subsequent ITO etching with hydrochloric acid can create an array of ITO heaters on the glass slide in lieu of a continuous ITO film. In this example, a particular formulation of a thermosetting SMP referred to as NGDE2 is used. It is worthwhile to note that the nanotexture formed on the Si master via a bSi process is transferred to the SMP pillars and coarsens after the two-step casting processes.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A device for manipulating liquid droplets, the device comprising:
   a structured surface comprising an array of larger pillars and a number of smaller pillars distributed among the larger pillars, each of the larger pillars comprising a shape memory polymer having a glass transition temperature $T_g$, the structured surface having an undeformed initial configuration, wherein the structured surface is configured to adopt a deformed configuration upon compression of the larger pillars, and wherein the undeformed initial configuration is configured to be recoverable from the deformed configuration by heating the shape memory polymer at or above the $T_g$, and wherein, when exposed to a liquid droplet, the structured surface comprises a first wettability in the deformed configuration and a second wettability in the undeformed initial configuration, the structured surface thereby comprising a dynamic wettability for manipulating liquid droplets.

2. The device of claim 1, wherein the smaller pillars also comprise the shape memory polymer.

3. The device of claim 1, wherein the first wettability is higher than the second wettability.

4. The device of claim 1, wherein the shape memory polymer is hydrophobic.

5. The device of claim 1, wherein the shape memory polymer is hydrophilic, and further comprising a hydrophobic coating on the shape memory polymer.

6. The device of claim 1, wherein the $T_g$ of the shape memory polymer is above room temperature.

7. The device of claim 1, wherein the larger pillars comprise nanotextured top surfaces having a roughness ratio of at least about 1.5.

8. The device of claim 1, wherein the larger pillars have a height-to-width aspect ratio of no greater than about 0.8.

9. The device of claim 1, wherein the larger pillars have a lateral dimension or width a, where 1 µm≤a≤100 µm.

10. The device of claim 1, wherein, in the undeformed initial configuration, each of the larger pillars has a first height $h_1$, and wherein each of the smaller pillars comprises a second height $h_2$, and wherein a height difference $h_{ori}=h_1-h_2$ is larger than a meniscus height of a liquid droplet on the larger pillars.

11. The device of claim 1, further comprising an internal heater in thermal contact with the structured surface.

12. The device of claim 11, wherein the internal heater comprises a conductive film, the internal heater being configured for resistive heating of the structured surface.

13. The device of claim 11, wherein the device comprises a plurality of the internal heaters, each internal heater being independently controllable.

14. A method to manipulate a liquid droplet on a surface, the method comprising:
applying a liquid droplet to a structured surface comprising an array of larger pillars and a number of smaller pillars distributed among the larger pillars, each of the larger pillars comprising a shape memory polymer having a glass transition temperature $T_g$, the structured surface being in a deformed configuration where the larger pillars are compressed relative to an undeformed initial configuration of the structured surface, the liquid droplet contacting the structured surface at a first apparent contact angle corresponding to a first wettability of the structured surface in the deformed configuration; and
heating the structured surface at or above the $T_g$, the structured surface thereby recovering the undeformed initial configuration and the liquid droplet contacting the structured surface at a second apparent contact angle corresponding to a second wettability of the structured surface in the undeformed initial configuration, the liquid droplet thereby being manipulated on the structured surface.

15. The method of claim 14, wherein the first apparent contact angle is lower than the second apparent contact angle, the first wettability being higher than the second wettability.

16. The method of claim 14, further comprising, prior to applying the liquid droplet to the structured surface:
heating the structured surface at or above the $T_g$ and compressing the larger pillars, the structured surface thereby adopting the deformed configuration; and
cooling the structured surface to a temperature below the $T_g$, thereby rigidizing the structured surface in the deformed configuration.

17. The method of claim 14, wherein the heating is carried out using an external heater selected from the group consisting of: a furnace, heat lamp and laser.

18. The method of claim 14, wherein the heating is carried out using an internal heater comprising a conductive film in contact with the structured surface, the heating comprising resistive heating.

19. A method of moving a liquid droplet over a surface, the method comprising:
applying a liquid droplet to a structured surface comprising an array of larger pillars and a number of smaller pillars distributed among the larger pillars, each of the larger pillars comprising a shape memory polymer having a glass transition temperature $T_g$, the structured surface being in a deformed configuration where the larger pillars are compressed relative to an undeformed initial configuration of the structured surface, and the structured surface including n regions configured for independent heating, each of the n regions including one or more of the larger pillars, where the liquid droplet comprises a rear portion in contact with a first of the n regions and a leading portion forward of the rear portion;
locally heating the first of the n regions of the structured surface at or above the $T_g$, thereby inducing the larger pillar(s) in the first region to exhibit shape recovery to an uncompressed shape, an apparent contact angle of the rear portion of the liquid droplet becoming greater than an apparent contact angle of the leading portion of the liquid droplet so as to produce a morphological gradient force, the liquid droplet thereby advancing on the structured surface such that the rear portion contacts a second of the n regions,
wherein the local heating is carried out sequentially for a predetermined pattern of adjacent regions to advance the liquid droplet across the structured surface.

20. The method of claim 19, wherein the locally heating occurs at a temperature of at least about $T_g+20°$ C. to produce a thermal gradient force in addition to the morphological gradient force for advancement of the liquid droplet.

21. The method of claim 19, further comprising, prior to applying the liquid droplet to the structured surface:
heating the structured surface at or above the $T_g$ and compressing the larger pillars, the structured surface thereby adopting the deformed configuration; and
cooling the structured surface to a temperature below the $T_g$, thereby rigidizing the structured surface in the deformed configuration.

22. The method of claim 19, wherein the local heating is carried out using an external heater comprising a laser beam or a heated stencil.

23. The method of claim 22, wherein light-absorbing particles are embedded within the n regions of the structured surface.

24. The method of claim 19, further comprising n internal heaters, each of the n internal heaters being in thermal contact with one of the n regions, and wherein the local heating comprises activating an $i^{th}$ of the n internal heaters to locally heat the $i^{th}$ region, where $1 \leq i \leq n$.

25. The method of claim 19, wherein the n regions are arranged in a one-dimensional array and the predetermined pattern is a linear pattern.

26. The method of claim 19, wherein the n regions are arranged in a two-dimensional array and the predetermined pattern is a linear or a non-linear pattern.

* * * * *